United States Patent
Yang et al.

(10) Patent No.: US 11,956,680 B2
(45) Date of Patent: Apr. 9, 2024

(54) SERVING APERIODIC TRAFFIC OVER SIDELINK USING RESOURCE ADAPTATION OF PERIODIC RESOURCE RESERVATIONS

(71) Applicant: QUALCOMM Incorporated, San Diego, CA (US)

(72) Inventors: Wei Yang, San Diego, CA (US); Seyedkianoush Hosseini, San Diego, CA (US); Wanshi Chen, San Diego, CA (US); Seyed Ali Akbar Fakoorian, San Diego, CA (US); Hwan Joon Kwon, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 17/318,944

(22) Filed: May 12, 2021

(65) Prior Publication Data
US 2021/0385697 A1    Dec. 9, 2021

Related U.S. Application Data

(60) Provisional application No. 63/036,792, filed on Jun. 9, 2020.

(51) Int. Cl.
*H04W 28/26* (2009.01)
*H04W 72/02* (2009.01)
(Continued)

(52) U.S. Cl.
CPC .......... *H04W 28/26* (2013.01); *H04W 72/02* (2013.01); *H04W 72/0446* (2013.01);
(Continued)

(58) Field of Classification Search
None
See application file for complete search history.

(56) References Cited

U.S. PATENT DOCUMENTS

2020/0029340 A1    1/2020  He et al.

FOREIGN PATENT DOCUMENTS

WO    2020033088 A1    2/2020

OTHER PUBLICATIONS

International Search Report and Written Opinion—PCT/US2021/032329—ISA/EPO—dated Oct. 15, 2021.

*Primary Examiner* — Walter J Divito
(74) *Attorney, Agent, or Firm* — Procopio, Cory, Hargreaves & Savitch LLP

(57) ABSTRACT

Apparatus, methods, and computer-readable media for facilitating serving aperiodic traffic over sidelink using resource adaptation of periodic resource reservations are disclosed herein. An example method for wireless communication at a first device includes reserving periodic resources for sidelink transmission. The example method also includes modifying the reserved periodic resources within a period based on a traffic load for the period. The example method also includes transmitting sidelink communication in the period based on the modified periodic resources. Another example method of wireless communication at a wireless device includes receiving a periodic resource reservation for sidelink transmission. The example method also includes receiving a modification of the periodic resource reservation for a period. Further, the example method includes transmitting or receiving sidelink communication in the period based on a modified periodic resource.

26 Claims, 16 Drawing Sheets

(51) Int. Cl.
*H04W 72/0446* (2023.01)
*H04W 72/0453* (2023.01)
*H04W 72/20* (2023.01)
*H04W 72/52* (2023.01)

(52) U.S. Cl.
CPC ....... *H04W 72/0453* (2013.01); *H04W 72/20* (2023.01); *H04W 72/52* (2023.01)

SERVING APERIODIC TRAFFIC OVER SIDELINK USING RESOURCE ADAPTATION OF PERIODIC RESOURCE RESERVATIONS

CROSS REFERENCE TO RELATED APPLICATION(S)

This application claims the benefit of U.S. Provisional Patent Application Ser. No. 63/036,792, entitled "METHODS AND APPARATUS TO FACILITATE SERVING APERIODIC TRAFFIC OVER SIDELINK USING RESOURCE ADAPTATION OF PERIODIC RESOURCE RESERVATIONS," and filed on Jun. 9, 2020, which is expressly incorporated by reference herein in its entirety.

TECHNICAL FIELD

The present disclosure relates generally to communication systems, and more particularly, to wireless communication based on sidelink.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as based on sidelink. There exists a need for further improvements in sidelink communication technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a wireless device. An example apparatus reserves periodic resources for sidelink transmission. The example apparatus also modifies the reserved periodic resources within a period based on a traffic load for the period. Further, the example apparatus transmits sidelink communication in the period based on the modified periodic resources.

In another aspect of the disclosure, a method, a computer-readable medium, and an apparatus are provided for wireless communication at a wireless device. An example apparatus receives a periodic resource reservation for sidelink transmission. The example apparatus also receives a modification of the periodic resource reservation for a period. Further, the example apparatus transmits or receives sidelink communication in the period based on a modified periodic resource.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
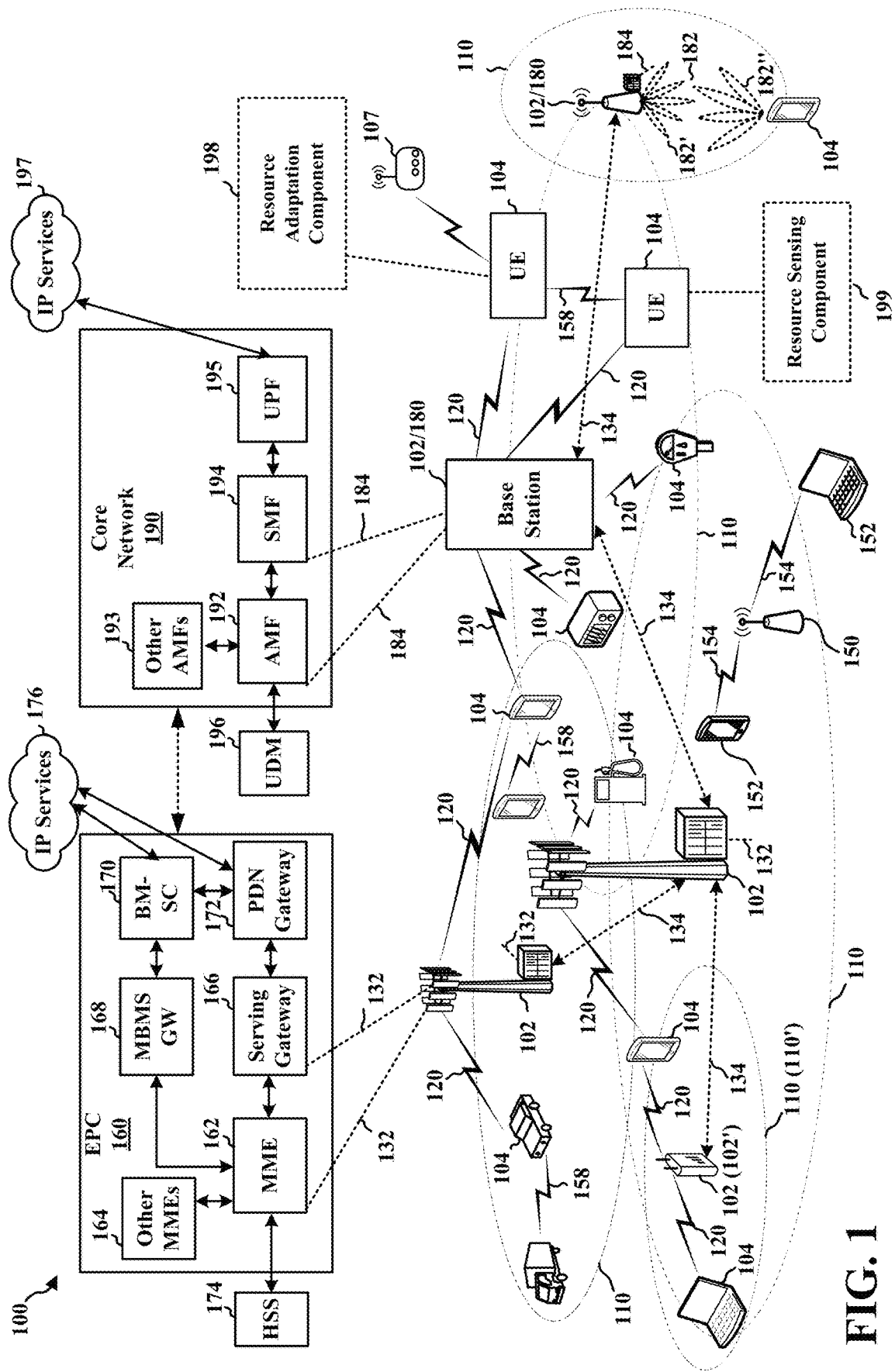
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A link between a UE and a base station may be established as an access link, for example, using a Uu interface. Other communication may be exchanged between wireless devices based on sidelink. For example, some UEs may communicate with each other directly using a device-to-device (D2D) communication link, such as sidelink. Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. Sidelink communication may be exchanged based on a PC5 interface, for example.

A resource allocation mechanism based on sensing and/or partial sensing may be based on periodic resource allocation/reservation, as periodic resource reservation allows sidelink transmitting UE(s) to identify and predict the activity of other transmitting UE(s) based on their past activities (e.g., their use of reserved resources, etc.). Thus, the mechanism may reduce occurrences of resource collisions between different transmitting UEs. However, the sensing or partial sensing mechanism may be less effective for aperiodic traffic or aperiodic resource allocation because the activity of other UEs may be less predictable. In addition, the periodic resource allocation may also not be flexible enough to accommodate aperiodic traffic. For example, as the periodic resource allocation has a fixed resource allocation in every period, the resource allocation within a resource selection window may be fully reserved by multiple UEs for retransmissions, giving aperiodic traffic less options of available resources within the resource selection window. Further, a transmitting UE may reserve a resource and elect not to use the reserved resource, which may result in a waste of the resource and reduce flexibility for other UEs to reuse the resource.

Aspects presented herein facilitate serving aperiodic traffic over sidelink using resource adaptation of periodic resource reservations. The aspects presented herein enable a wireless device to reserve periodic resources based on a sensing or partial sensing technique while also providing support for aperiodic traffic. When the wireless device detects a change in traffic load for a transmission period, the wireless device may derive a resource allocation based on the periodic resources reserved for the transmission period. Thus, example techniques disclosed herein enable a transmitting device to adapt a resource reservation based on instantaneous data traffic. Additionally, disclosed techniques enable a sensing device to perform sensing or partial sensing techniques to facilitate predicting future activity of other devices. FIG. 1 is a diagram illustrating an example of a wireless communications system and an access network 100 including base stations 102 and 180 and UEs 104. In some examples, a wireless device, such as a UE 104, may be configured to manage one or more aspects of wireless communication by facilitating serving aperiodic traffic over sidelink using resource adaptation of periodic resource reservations. As an example, in FIG. 1, the UE 104 may include a resource adaptation component 198. In certain aspects, the resource adaptation component 198 may be configured to reserve periodic resources for sidelink transmission. The example resource adaptation component 198 may also be configured to modify the reserved periodic resources within a period based on a traffic load for the period. Additionally, the example resource adaptation component 198 may be configured to transmit sidelink communication in the period based on the modified periodic resources.

In another configuration, a wireless device, such as the example UE 104, may be configured to manage one or more aspects of wireless communication by facilitating sensing of resource adaptations of periodic resource reservations over sidelink. As an example, in FIG. 1, the UE 104 may additionally or alternatively include a resource sensing component 199. In certain aspects, the resource sensing component 199 may be configured to receive a periodic resource reservation for sidelink transmission. The example resource sensing component 199 may also be configured to receive a modification of the periodic resource reservation for a period. Further, the example resource sensing component 199 may be configured to transmit or receive sidelink communication in the period based on a modified periodic resource.

Although the following description provides examples directed to 5G NR, the concepts described herein may be applicable to other similar areas, such as LTE, LTE-A, CDMA, GSM, and/or other wireless technologies, in which a UE may communicate using sidelink.

Certain UEs 104 may communicate with each other using device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PS SCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

Devices may use beamforming to transmit and receive communication. For example, FIG. 1 illustrates that a base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first device and a second device (e.g., a first UE and a second UE) for sidelink communication. For example, aspects of beamforming may similarly may be applied by UE 104 or RSU 107 to communicate with another UE 104 or RSU 107, such as based on V2X, V2V, or D2D communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MB SFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
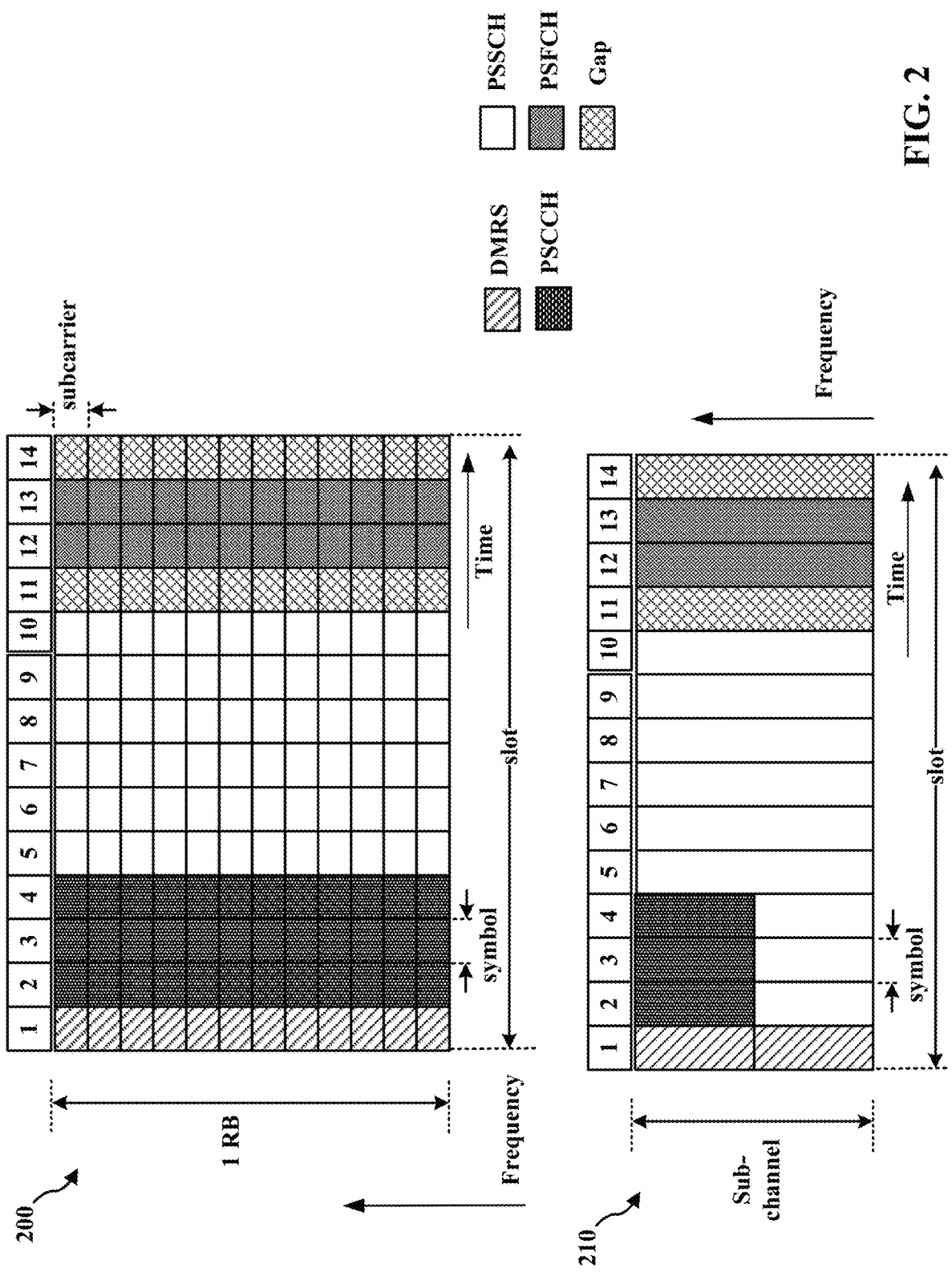
FIG. 2 illustrates example aspects of a sidelink slot structure, in accordance with various aspects of the present disclosure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
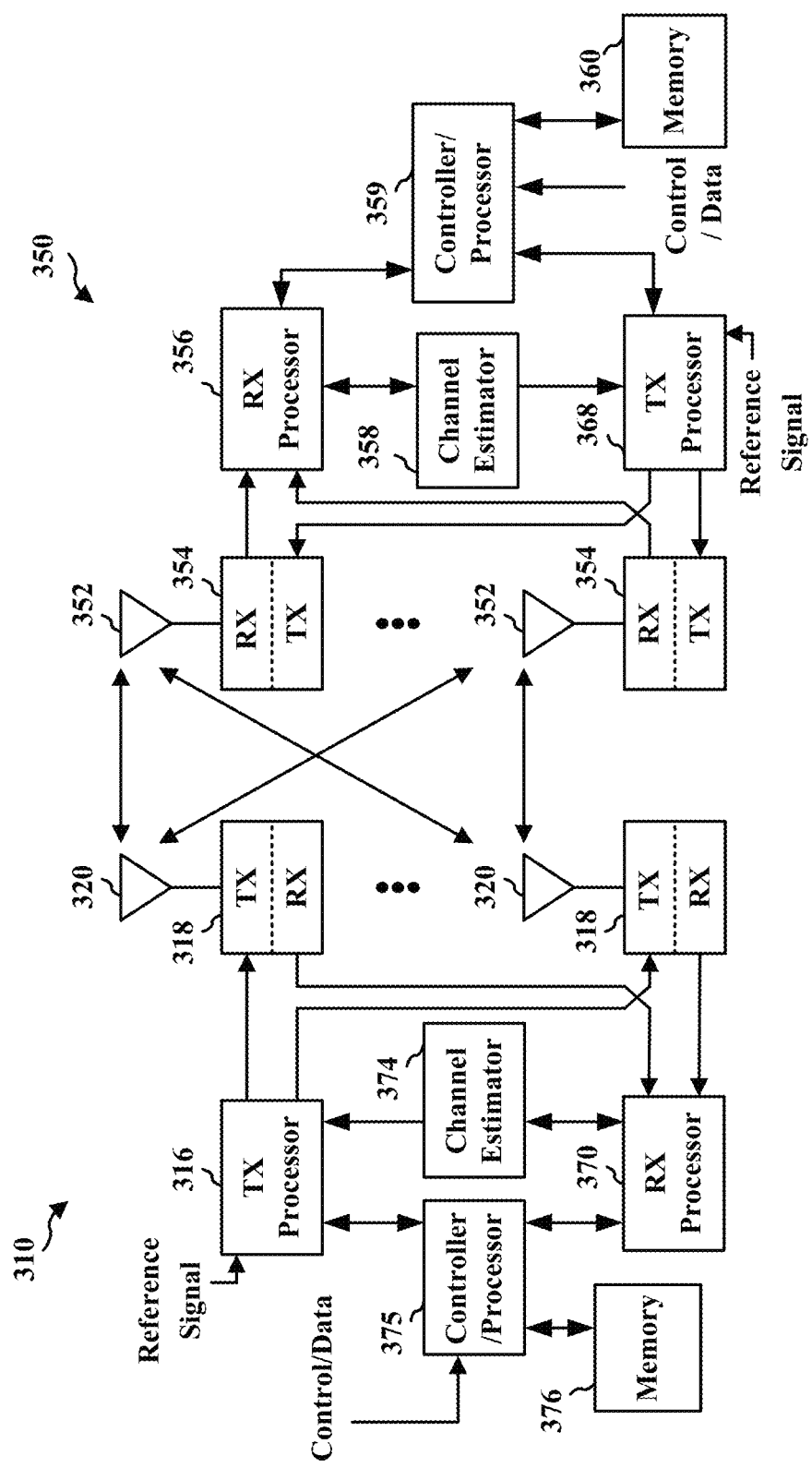
FIG. 3 is a diagram illustrating an example of a first device and a second device involved in sidelink communication.

FIG. 3 is a block diagram 300 of a first wireless communication device 310 in communication with a second wireless communication device 350 based on sidelink. In some examples, the devices 310, 350 may communicate based on V2X or other D2D communication. The communication may be based on sidelink using a PC5 interface. The devices 310, 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318TX. Each transmitter 318TX may modulate an RF carrier with a respective spatial stream for transmission.

At the second wireless communication device 350, each receiver 354RX receives a signal through its respective antenna 352. Each receiver 354RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the first wireless communication device 310 in a manner similar to that described in connection with the receiver function at the second wireless communication device 350. Each receiver 318RX receives a signal through its respective antenna 320. Each receiver 318RX recovers information modulated onto an RF carrier and provides the information to the RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 316 or 368, the RX processor 356 or 370, and the controller/processor 359 or 375 may be configured to perform aspects described in connection with the resource adaptation component 198 and/or the resource sensing component 199 of FIG. 1.

Figure 4:
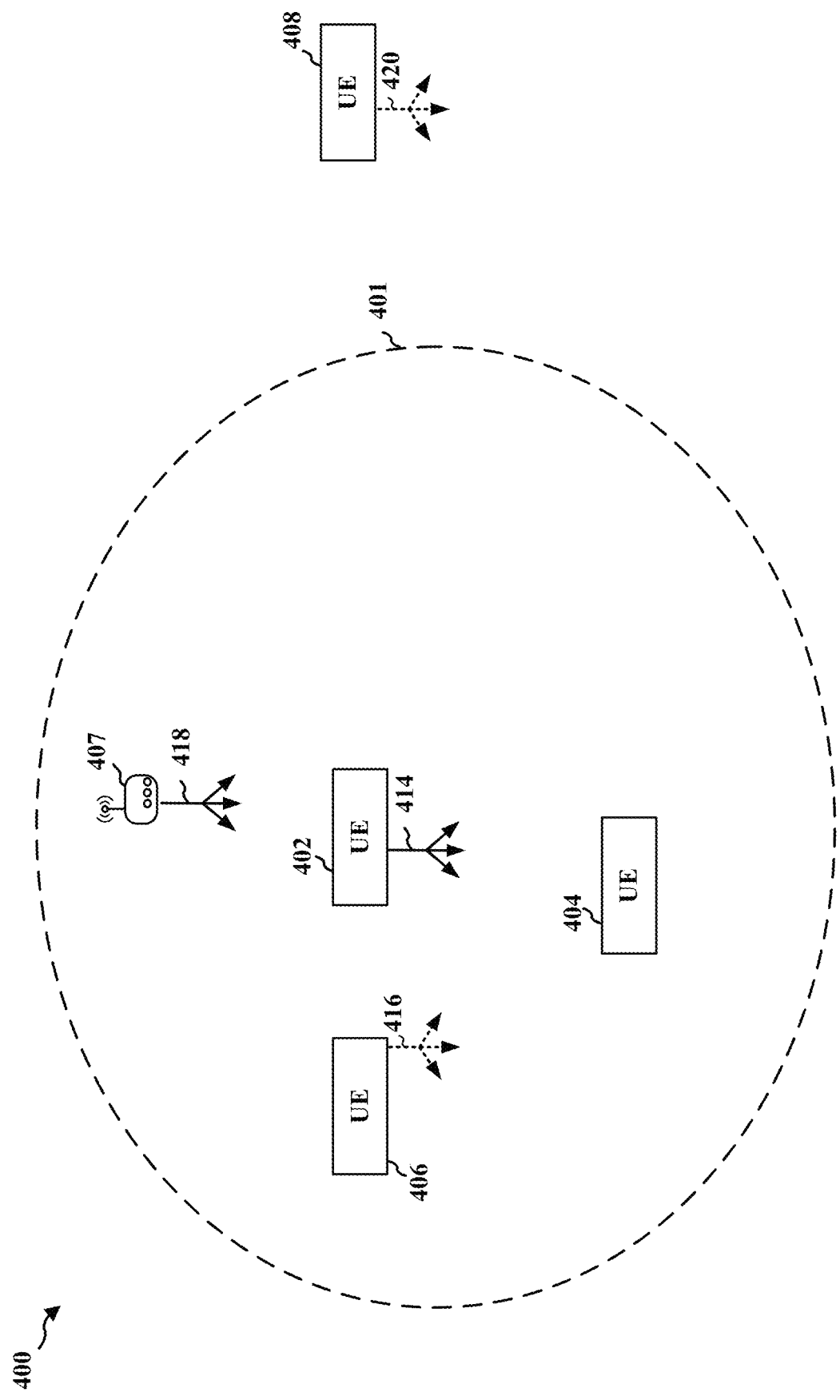
FIG. 4 illustrates an example of sidelink communication between wireless devices, in accordance with one or more of the teachings disclosed herein.

FIG. 4 illustrates an example 400 of sidelink communication between wireless devices. The communication may be based on a slot structure comprising aspects described in connection with FIG. 2 or another sidelink structure. Although the example in FIG. 4 is described for example UEs 402, 404, 406, 408, aspects may be applied to other wireless devices configured for communication based on sidelink, such as an RSU, an IAB node, etc. As illustrated in FIG. 4, a transmitting UE 402 may transmit a transmission 414 comprising control information (e.g., sidelink control information (SCI)) and/or a corresponding data channel. The transmission 414 may be received by receiving UEs 404, 406, 408. The SCI may include information for decoding the corresponding data and may also be used by receiving device to avoid interference by refraining from transmitting on the occupied resources during a data transmission. For example, the SCI may reserve resources for sidelink communication. The number of TTIs, as well as the RBs that will be occupied by the data transmission, may be indicated in SCI from the transmitting device. The UEs 402, 404, 406, 408 may each be capable of operating as a transmitting device in addition to operating as a receiving device. Thus, the UEs 406, 408 are illustrated as transmitting transmissions 416, 420, respectively. One or more of the transmissions 414, 416, 420 may be broadcast or multicast to nearby devices. For example, the UE 402 may transmit communication intended for receipt by other UEs within a range 401 of the UE 402. In other examples, one or more of the transmissions 414, 416, 420 may be groupcast to nearby devices that a member of a group. In other examples, one or more of the transmissions 414, 416, 420 may be unicast from one UE to another UE. Additionally, or alternatively, an RSU 407 may receive communication from and/or transmit communication 418 to the UEs 402, 404, 406, 408.

The UE 402, 404, 406, 408 and/or the RSU 407 may comprise a resource adaptation component, similar to the resource adaptation component 198 described in connection with FIG. 1. The UE 402, 404, 406, 408 and/or the RSU 407 may additionally or alternatively comprise a resource sensing component, similar to the resource sensing component 199 described in connection with FIG. 1.

Resource allocation refers to how a resource is allocated to a device to use for transmitting a packet. In sidelink communication, resource allocation may be performed in a centralized manner (e.g., a resource allocation mode 1) or a decentralized manner (a resource allocation mode 2). When operating using the centralized resource allocation mode, resource allocations for sidelink communication are determined by a network entity, such as a base station. For example, the network entity may transmit an indication to a UE that indicates the resources that are allocated to the UE to use to transmit sidelink communication (e.g., sidelink data packets to other UEs).

In other examples, a sidelink-capable device, such as a UE, may autonomously determine resources for sidelink transmissions by sensing, or monitoring, for reservations of other sidelink-capable devices. The autonomous resource selection may be referred to as "resource allocation mode 2," a "decentralized" resource allocation mode, or a sensing-based sidelink resource allocation mode, e.g., where each sidelink-capable device selects its own sidelink resources for sidelink transmissions. In contrast to the centralized resource allocation mode in which a network entity may assign sidelink resources, in the decentralized sidelink resource allocation mode, a UE may autonomously select sidelink transmission resources based on a sensing and resource reservation procedure.

When a sidelink-capable device, such as a UE, is preparing to transmit data, the sidelink-capable device may select transmission resources from a candidate resource set from which previously reserved resources are excluded. In order to maintain the candidate resource set, the transmitting UE may monitor for resource reservations from other sidelink-capable devices. For example, the transmitting UE may receive SCI from other UEs including reservation information in a resource reservation field. The number of resources (e.g., sub-channels per subframe) reserved by a UE may depend on the size of data to be transmitted by the UE. The transmitting UE may exclude resources that are used and/or reserved by the other UEs from a candidate resource set. The exclusion of the reserved resources enables the UE to select/reserve resources for a transmission from the resources that are unused/unreserved. Although the example is described for a UE receiving reservations from another UE, the reservations may also be received from an RSU or other device communicating based on sidelink.

Figure 5A:
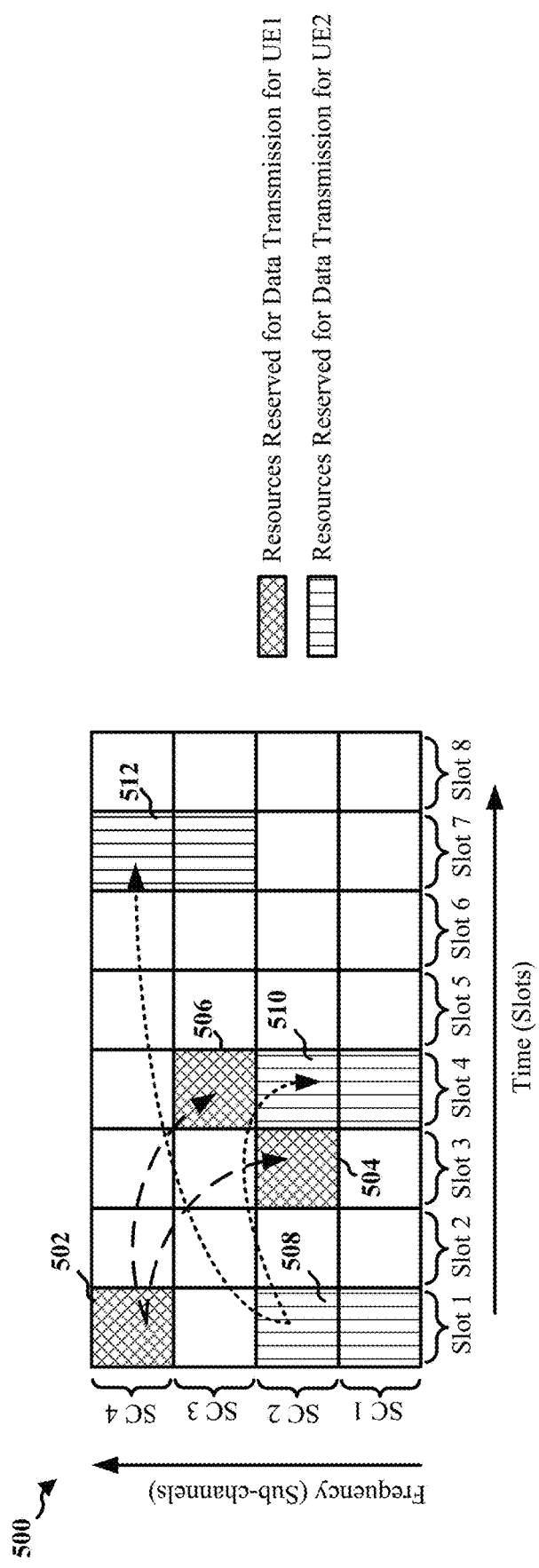
FIG. 5A is a diagram illustrating an example of resource reservations, in accordance with one or more of the teachings disclosed herein.

When employing the autonomous resource selection mode, the transmitting UE may determine the resources to use for communicating from a resource pool. A resource pool refers to a collection of time and/or frequency resources on which sidelink communication may occur. FIG. 5A illustrates an example of time frequency resources that may be available for sidelink communication. A resource pool may be either preconfigured (e.g., preloaded on a UE), configured by a base station, or otherwise determined by the UE. In some examples, a transmitting UE may randomly select resources from a resource pool for a transmission. In such examples, receiving UEs may continuously monitor candidate resources to receive a communication. Additionally, in some examples, if a nearby UE randomly selects the same resource, a collision or interference may occur.

Figure 5B:
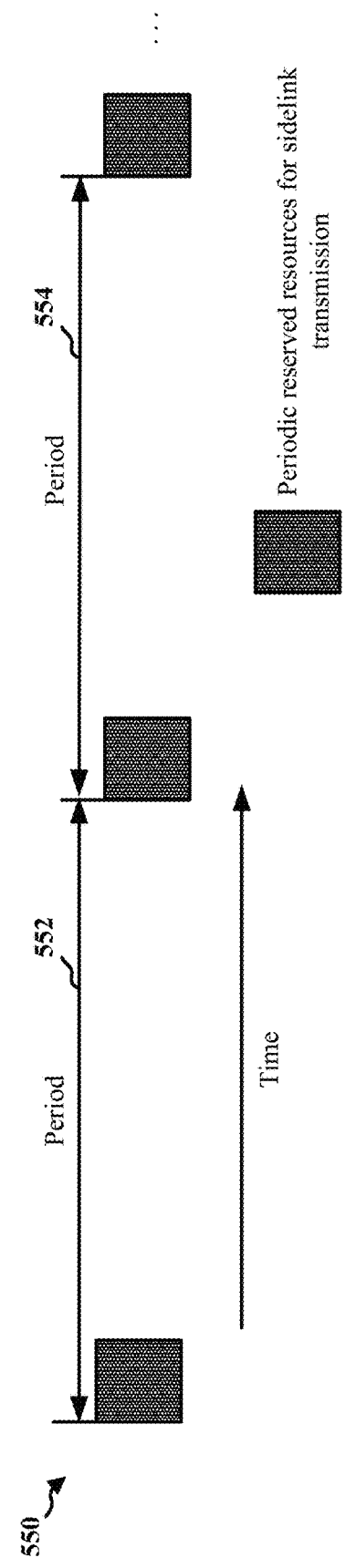
FIG. 5B illustrates an example of period resource that may be reserved by a UE for sidelink communication, in accordance with one or more of the teachings disclosed herein.

In some examples, a UE may use historical resource utilization of other UEs to predict future activity. For example, by identifying that a first UE transmits periodically and what resources the first UE uses when transmitting, a second UE may determine on which resources future transmissions by the first UE may occur and also when they may occur. FIG. 5B illustrates an example of period resource 550 that may be reserved by a UE for sidelink communication. In the illustrated example of FIG. 5B, the period resource 550 includes a first period 552 and a second period 554. By "listening" to other UE activity in the past (e.g., historical resource utilization), the second UE may predict future activity of the other UEs and can select a resource to use for a transmission that is less likely to result in a collision and/or interference.

However, for the second UE to identify historical resource utilization, the second UE may operate in an "always-on" mode to facilitate sensing or receiving of transmission by the other UEs. The continual monitoring by the second UE increases power consumption or processing resources in order to identify historical resource utilization and to predict future activity.

In some examples, a UE may perform partial sensing for determining historical resource utilization of other UEs. When performing partial sensing, the UE may selectively sense a subset of resources and, thus, may reduce power consumption in comparison to monitoring the set of resources. However, partial sensing may not be effective when transmissions by other UEs are not periodic. For example, a UE employing partial sensing may miss information about aperiodic transmissions and, thus, may be unable to accurately predict future activity of the other UEs based on a determined historical resource utilization.

The radio resource allocation for a sidelink communication may be based on resource reservations. For instance, when a UE is preparing to transmit data on sidelink, the UE may first determine whether resources are reserved by other UEs. Then, the UE may reserve resources from the remaining unreserved resources that are available. FIG. 5A is a diagram 500 illustrating an example of resource reservations for sidelink transmissions. The resource allocation for each UE may be in units of one or more sub-channels in the frequency domain (e.g., sub-channels SC 1 to SC 4), and may be based on one time slot in the time domain. The UE may also use resources in the current slot to perform an initial transmission, and may reserve resources in future slots for retransmissions. In this example, up to two different future slots may be reserved by the UEs (e.g., UE1 and UE2) for retransmissions. The resource reservation may be limited to a window of pre-defined slots and sub-channels, such as an example eight time slots by four sub-channels window, as shown in diagram 500, which provides 32 available resource blocks in total. This example window may also be referred to as a "resource selection window." Each resource block in the resource selection window may be used to transmit both data and control information together.

In one example, a first UE ("UE1") may reserve a sub-channel (e.g., SC 4) in a current slot (e.g., time slot 1) for an initial data transmission (e.g., resource 502), and may reserve additional future slots within the resource selection window for data retransmissions (e.g., resources 504, 506). For example, UE1 may reserve a sub-channel SC 2 at time slot 3 (e.g., the resource 504) for a first future retransmission and may reserve a sub-channel SC 3 at time slot 5 (e.g., the resource 506) for a second future retransmission, as shown by FIG. 5A. UE1 may then transmit information regarding which resources are being used and/or reserved by UE1 to other UE(s), such as by including reservation information in a reservation resource field of the SCI (e.g., a first stage SCI). In some examples, the UE may be configured to use the SCI to reserve one, two, or three transmissions. In some examples, a maximum number of reservations allowed for a UE may be pre-configured for the UE. For example, a UE may be pre-configured to reserve up to three transmissions within a resource selection window.

As illustrated by FIG. 5A, a second UE ("UE2") may also reserve resources in sub-channels SC 1 and SC 2 at time slot 1 (e.g., resource 508) for a current data transmission. UE2 may also reserve sub-channels SC 1 and SC 2 at time slot 4 (e.g., resource 510) to use for transmitting a first data retransmission, and may reserve sub-channels SC 3 and SC 4 at time slot 7 (e.g., resource 512) to use for transmitting a second data retransmission, as shown by FIG. 5A. Similar to the example of UE1, UE2 may then transmit information regarding the resource usage and/or reservation information to other UE(s), such as by using the reservation resource field in SCI. In some examples, a UE may be configured to make reservations using a same number of sub-channels (e.g., bandwidth). For example, the resources 502, 504, 506 reserved by UE1 have a same number of sub-channels (e.g., 1 sub-channel), and the resources 508, 510, 512 reserved by UE2 have a same number of sub-channels (e.g., 2 sub-channels). However, the starting sub-channel for each reserved resource may be different. For example, the initial data transmission may start at sub-channel SC 4, the first future retransmission may start at sub-channel SC 2, and the second future retransmission may start at sub-channel SC3, etc.

Figure 6:
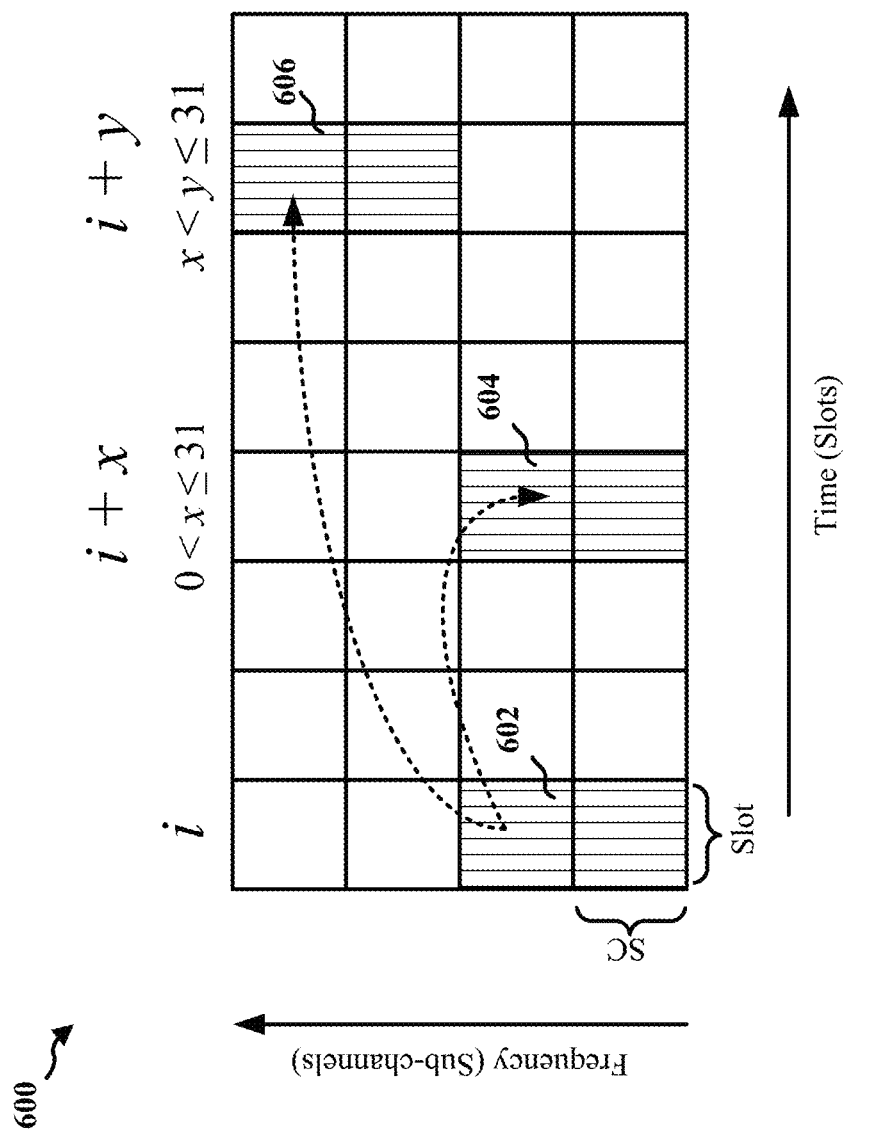
FIG. 6 is a diagram illustrating an example of resource reservation, in accordance with one or more of the teachings disclosed herein.

FIG. 6 is a diagram 600 illustrating an example of a resource reservation process. When a UE (e.g., a sidelink transmitting UE) is using a first resource 602 for transmission at time slot i in a period (such as the periods 552, 554 illustrated in FIG. 5B), the UE may reserve two more resources within the same period, such as a first future resource 604 at time slot i+x and a second future resource 606 at time slot i+y. Each of the reserved resources (e.g., the first resource 602 and the two future resources 604, 606) may be associated with a number z of sub-channels. For example, if the period has 32 slots with slot index 0 to 31, the UE may transmit using the first resource 602 at time slot 0 with z sub-channels, and may reserve the first future resource 604 with z sub-channels at time slot i+x, where x is 0<x≤31. The UE may also reserve the second future resource 606 with z sub-channels at time slot i+y, where y is x<y≤31. Table 1 (below) illustrates example reservations signaled by the SCI of the UE in time slot i corresponding to FIG. 6.

TABLE 1

| Reservations Signaled by An SCI in Time Slot i | | |
| --- | --- | --- |
| Reservation | Number of Sub-channels | Time Slot |
| 1 | z | i |
| 2 | z | i + x: 0 < x ≤ 31 |
| 3 | z | i + y: x < y ≤ 31 |

The UE may use the first future resource 604 and the second future resource 606 for retransmission, such as when an initial transmission using the first resource 602 fails. The UE may additionally or alternatively use one or both of the reserved future resources 604, 606 for purposes other than retransmission.

A UE using a reserved resource for transmission may request feedback with respect to the transmission from other UE(s) or base station(s). Based on the feedback from other UE(s) or base station(s), the UE may elect not to use a reserved resource. For example, a transmitting UE may use the first resource 602 for a data transmission, and may request a receiving UE or a base station receiving the data transmission to provide feedback to the transmitting UE. If the transmitting UE receives feedback from the receiving UE or the base station confirming receipt of the data transmission, the transmitting UE may elect not to use the reserved future resources 604, 606, which may have been originally reserved for retransmissions of the data transmission.

The sidelink resource reservation may be periodic or aperiodic. For example, a UE may periodically reserve resources, such as by indicating a reservation period in an SCI or in one part of the SCI (e.g., a first state control (SCI-1)). Thus, when the periodic resource reservation is enabled, the reservations indicated by the SCI may be repeated with the signaled period. In some examples, if the resource reservation is periodic, the reservation period may be configured to values between 0 milliseconds (ms) and 1000 ms by signaling in the SCI, and the periodic resource reservation may additionally or alternatively be disabled by a (pre-)configuration. In some examples, each reservation of resources may have a priority level indicated in the SCI. In some such example, a higher priority reservation may preempt a lower priority reservation.

In some examples, a resource reservation for sidelink communication may be indicated by a transmitting UE in multiple SCI parts. The SCI may indicate resources that the UE intends to use, for example, for a sidelink transmission. The UE may transmit a first part of the reservation in a physical sidelink control channel (PSCCH) region, and may transmit a second part of the reservation in a physical sidelink shared channel (PSSCH) region. For example, a first stage control (e.g., SCI-1) may be transmitted on a PSCCH and may contain information for resource allocation and information related to the decoding of a second stage control (e.g., SCI-2). The second stage control (SCI-2) may be transmitted on a PSSCH and may contain information for decoding data (SCH). Therefore, multiple resources may be indicated (or reserved) through a combination of the first SCI part included in the PSCCH region (e.g., the SCI-1) and the second SCI part included in the PSSCH region (e.g., the SCI-2). For example, the first SCI part in the PSCCH may reserve resource(s) for a UE in a PSSCH, and the first SCI part may also indicate to a receiving UE that there is a second SCI part or more (e.g., two-stage control SCI) in the PSSCH. The second SCI part may reserve other resources, provide signaling, and/or provide information to the receiving UE that may be unrelated to the resources reserved in the first SCI part.

Figure 7:
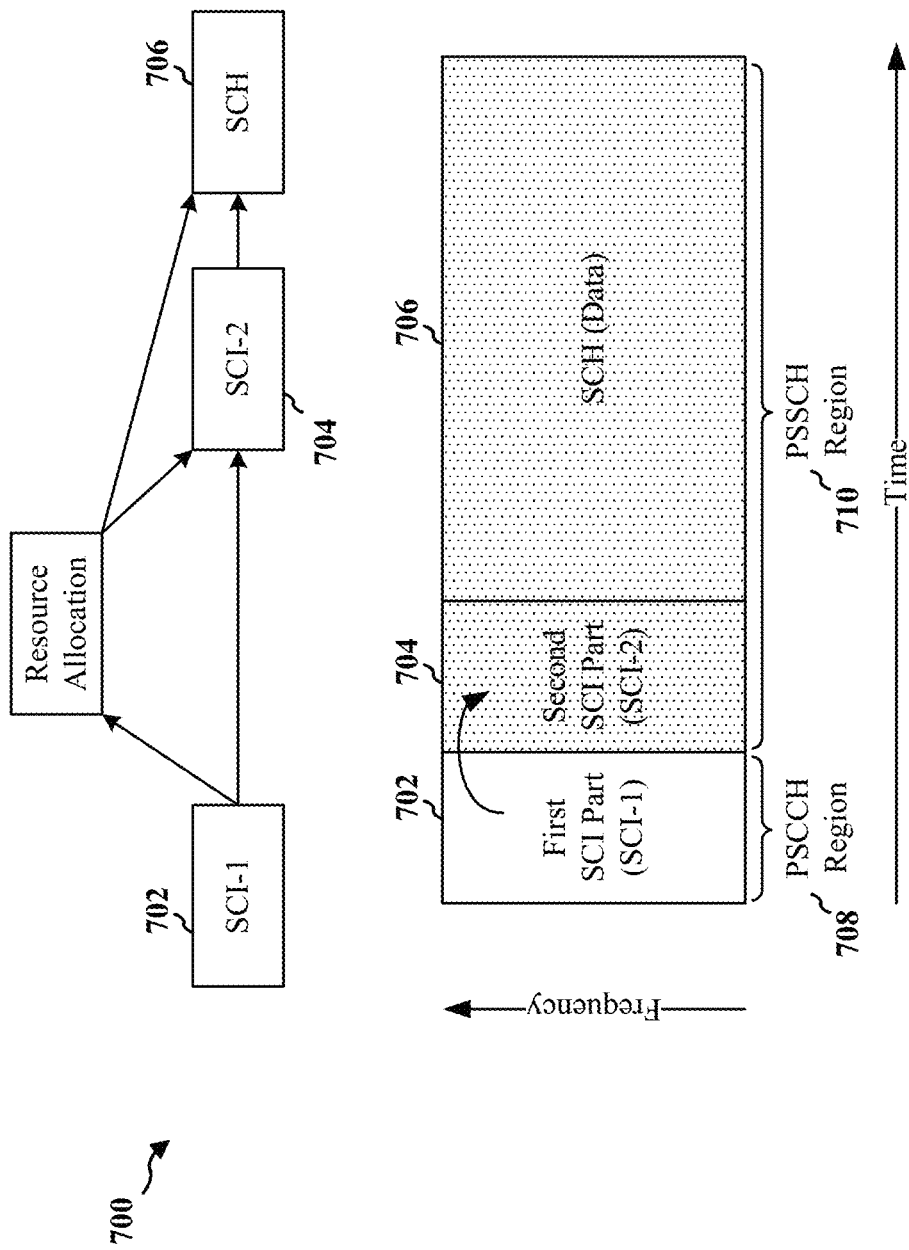
FIG. 7 is a diagram illustrating an example of two-stage physical sidelink control channel (PSCCH), in accordance with one or more of the teachings disclosed herein.

FIG. 7 is a diagram 700 illustrating an example of a two-stage SCI. To reduce control overhead and to improve the processing timeline, SCI used for sidelink grant(s) may be split into two or more parts. In the illustrated example, a first SCI part 702 (e.g., SCI-1) may be transmitted within a control region (e.g., a PSCCH region 708) and a second SCI part 704 (e.g., SCI-2) may be transmitted within a downlink traffic region (e.g., a PS SCH region 710). The PSCCH region 708 and the PS SCH region 710 may together form one slot. The first SCI part 702 may include initial control information regarding a sidelink transmission, such as a resource assignment (RA) in SCH 706 or other resource reservation information, rank and modulation order of the sidelink assignment, etc. In addition, the first SCI part 702 may include control information about the second SCI part 704. In some examples, the control information may indicate the number of resource elements (or size) and code rate of the second SCI part 704. The control information may further indicate the location (e.g., starting resource element) and code rate of the second SCI part 704. The second SCI part 704 may include the remaining control information regarding the sidelink assignment. For example, the remaining control information may include non-time critical control information or other resource allocation(s) for data transmission in SCH 706, such as the source and destination ID for the data transmission. In one aspect, the first SCI part 702 (e.g., SCI-1) format may comprise one or more of the following information: a priority (QoS value), a PSSCH resource assignment (e.g., frequency/time resource for PSSCH), a resource reservation period (e.g., if enabled), a PS SCH DMRS pattern (e.g., if more than one pattern is configured), a second SCI format (e.g. information on the size of the second SCI part), a 2-bit beta offset for second stage control resource allocation, a number of PSSCH DMRS port(s) (e.g., 1 or 2), a 5-bit MCS and/or reserved bits, etc.

A resource allocation mechanism based on sensing and/or partial sensing may be based on periodic resource allocation/reservation, as periodic resource reservation allows sidelink transmitting UE(s) to identify and predict the activity of other transmitting UE(s) based on their past activities (e.g., their use of reserved resources, etc.). Thus, the mechanism may reduce occurrences of resource collisions between different transmitting UEs. However, the sensing or partial sensing mechanism may be less effective for aperiodic traffic or aperiodic resource allocation because the activity of other UEs may be less predictable. In addition, the periodic resource allocation may also not be flexible enough to accommodate aperiodic traffic. For example, as the periodic resource allocation has a fixed resource allocation in every period, the resource allocation within a resource selection window may be fully reserved by multiple UEs for retransmissions, giving aperiodic traffic less options of available resources within the resource selection window. Further, a transmitting UE may reserve a resource and elect not to use the reserved resource, which may result in a waste of the resource and reduce flexibility for other UEs to reuse the resource.

Aspects presented herein provide a periodic resource allocation mechanism that enables periodically reserved resources to be used for aperiodic sidelink traffic, which enables UEs to reserve resources periodically based on sensing of partial sensing techniques, while also providing support for aperiodic traffic. In one example, the resource reservation among one or more transmitting UEs may be periodic to facilitate the sensing activity by other transmitting UEs, such as described in connection with FIG. 5A. However, when the UE detects aperiodic traffic (e.g. a change in traffic load), the UE may adapt the periodically reserved resources.

Figure 8:
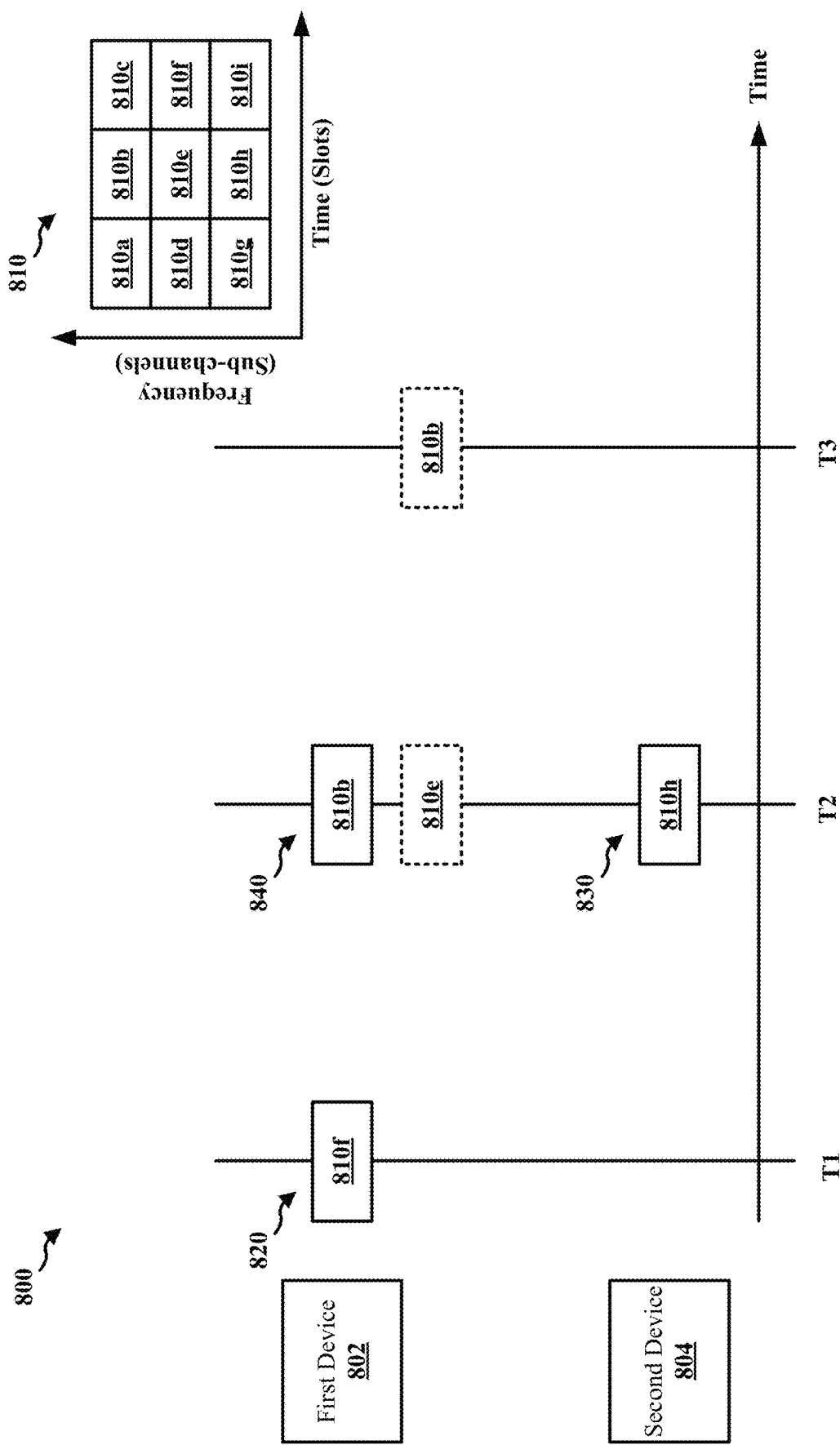
FIG. 8 is an example timeline illustrating periodic resource reservation for a first device and a second device, in accordance with one or more of the teachings disclosed herein.

FIG. 8 is an example timeline 800 illustrating periodic resource reservation for a first device 802 and a second device 804, in accordance with one or more of the teachings disclosed herein. Aspects of the first device 802 may be implemented by the UE 104, 402, 404, 406, 408, the device 310 or 350, and/or the RSU 107, 407. Aspects of the second device 804 may be implemented by the UE 104, 402, 404, 406, 408, the device 310 or 350, and/or the RSU 107, 407.

In the illustrated example of FIG. 8, the first device 802 and the second device 804 select resources from a resource pool 810 for transmitting packets. The example resource pool 810 includes nine resources from which the devices 802, 804 may select to use for a transmission. However, other example resource pools may include any suitable quantity of available resources. Each of the resources of the resource pool 810 may comprise one or more sub-channels in the frequency domain and/or one or more time slots in the time domain. For example, a resource 810a may comprise three sub-channels in the frequency domain and two time slots in the time domain. Reserved resources are illustrated using a dashed line and resources used for a transmission are illustrated using a solid line.

In the illustrated example, the first device 802 transmits a packet 820 at a first time (T1) using a first resource 810f of the resource pool 810. The first device 802 also reserves resources for transmissions at a second time (T2) and at a third time (T3). For example, the first device 802 reserves a second resource 810e to use at the time T2 and reserves a third resource 810b to use at time T3. In the illustrated example, time T1, time T2, and time T3 represent respective periods for transmission. Accordingly, the second resource 810e and the third resource 810b may be referred to as periodic resource reservations.

In some examples, when the first device 802 transmits the packet 820, the second device 804 may receive the packet 820 and receive an indication of the periodic resource reservation of the second resource 810e at time T2 and of the third resource 810b at time T3. Using the indication of the periodic resource reservations, the second device 804 may determine which resources of the resource pool 810 are available to the second device 804 for a transmission at time T2 and/or at time T3. For example, based on the reservation of the second resource 810e at time T2 by the first device 802, the second device 804 may determine to use any of the remaining resources of the resource pool 810 (e.g., the resources 810b to 810i) to use for transmitting a packet at the time T2. In the illustrated example, the second device 804 selects a fourth resource 810h to transmit a packet 830.

As described above, in some examples, a device may serve aperiodic traffic during a period. For example, based on a traffic load within the time T2, the first device 802 may determine to transmit a packet 840 using the third resource 810b of the resource pool 810. While no collision occurs in the illustrated example of FIG. 8 (e.g., there is an absence of a conflicting resource reservation), in examples in which the first device 802 determines to change the resource allocation at the time T2 (e.g., by changing the resource used to transmit the packet 840 from the second resource 810e to the fourth resource 810h), other UEs (e.g., the second device 804) may be unable to identify which resources are available for them to use to transmit a packet.

Example techniques disclosed herein enable a transmitting device to reserve a set of periodic resources that may be used to serve (or transmit) aperiodic traffic. For example, disclosed techniques enable the transmitting UE to adapt or "softly change" the resource allocation (e.g., the actual resource used to transmit a packet) during a transmission period, for example, based on a traffic load. However, as other devices may use information regarding periodic resource reservations to determine what resources are available for transmitting a packet, examples disclosed herein provide techniques for limiting the modification to the reserved resources so that other devices may continue to rely on periodic resource reservations for their determinations.

For example, a transmitting device may modify a reserved resource for transmitting a packet so that a ratio of the resource allocation (e.g., the modified reserved resource) to the reserved resource is within a range. In some examples, the range may include a lower bound ($\Gamma\_1$) that is less than or equal to one. The range may also include an upper bound ($\Gamma\_2$) that is greater than or equal to one. Thus, it may be appreciated that the resource allocation used to transmit a packet may be less than the reserved resource or more than the reserved resource. In some examples, the lower bound ($\Gamma\_1$) and/or the upper bound ($\Gamma\_2$) may be configured (or pre-configured) for the device.

Additionally, the transmitting device may restrict scheduling of the resources so that the resource allocation is derived from the reserved resource. For example, when the transmitting devices is decreasing resources for the resource allocation, the resources of the resource allocation may be selected from the resources of the reserved resource. When the transmitting device is increasing resources for the resource allocation, the resources of the resource allocation includes the resources of the reserved resources and then add additional resources.

Figure 9:
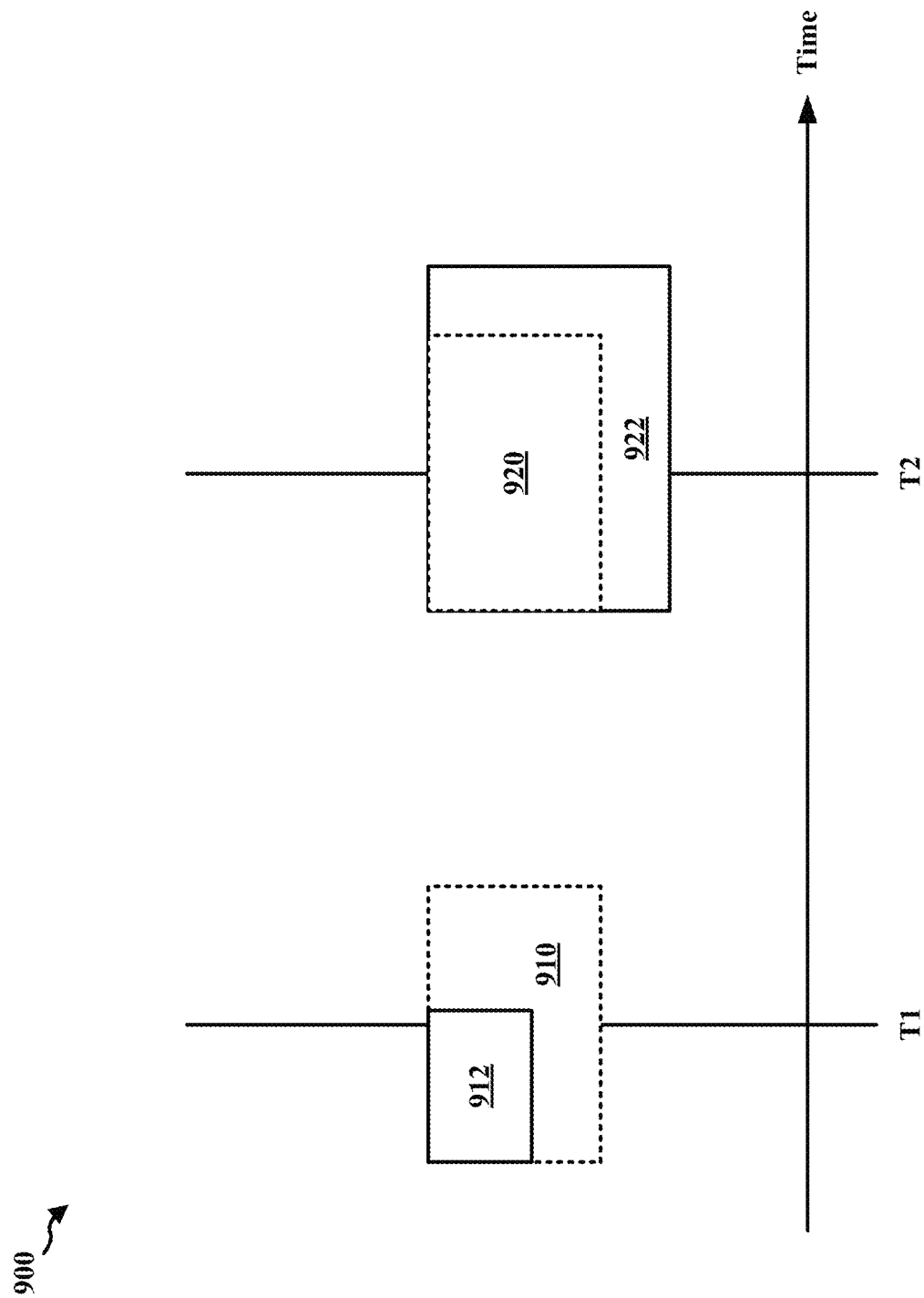
FIG. 9 is a diagram illustrating resource allocations derived from reserved resources, in accordance with one or more of the teachings disclosed herein.

FIG. 9 is a diagram 900 illustrating resource allocations derived from reserved resources, in accordance with one or more of the teachings disclosed herein. A device, such as the example first device 802 of FIG. 8, may reserve a first resource 910 for a first future transmission period T1 (e.g., the time T2 of FIG. 8) and may reserve a second resource 920 for a second future transmission period T2 (e.g., the time T3 of FIG. 8). However, due to a change in traffic loads at the future transmission periods (e.g., the times T1 and T2), the transmitting device may determine to modify the reserved resources 910, 920 to accommodate the change in traffic load when transmitting packets at the respective future transmission periods T1, T2. The reserved resources 910, 920 may comprise any suitable quantity of sub-channels in the frequency domain and any suitable quantity of time slots in the time domain.

In some examples, the transmitting device may determine to transmit a packet using fewer resources than the reserved resource. In such examples in which the resource allocation for the transmission is less than the reserved resource, the transmitting device may select the resources for the actual transmission of the packet from the reserved resource. For example, in FIG. 9, the transmitting device may determine to use a resource allocation 912 that comprises a subset of the resources of the first resource 910 to transmit the packet.

In some examples, the transmitting device may determine to transmit a packet using more resources than the reserved resource. In such examples in which the resource allocation for the transmission is more than the reserved resource, the transmitting device may first use all of the resources of the reserved resource before using non-reserved resources. For example, in FIG. 9, the transmitting device may determine to use a resource allocation 922 that comprises all of the resources of the second resource 920 and additional resources.

In the illustrated example of FIG. 9, the resource allocations 912, 922 are derived from the respective reserved resources 910, 920. Additionally, the amount of resources associated with the resource allocations 912, 922 is based on the amount of resources included in the respective reserved resources 910, 920. For example, a ratio of the resources associated with the resource allocation 912 to the resources associated with the first resource 910 may be within a range (e.g., a bounded range [$\Gamma\_1$, $\Gamma\_2$]).

In some examples, when a transmitting device is signaling a resource allocation (e.g., via SCI), the transmitting device may indicate the actual resource allocation that is being used for the current transmission. For example, the SCI (e.g., SCI-1) associated with the transmission at time T2 may include the resource allocation 922. In some such examples, the transmitting device may forego signaling reserved resources as other devices may use the indicated resource allocation in making their determinations of available resources. However, it may be appreciated that such signaling of actual resource allocations may result in uncertainty for sensing devices. For example, the transmitting device may change the resource allocation from transmission to transmission, which may result in uncertainty (e.g., relatively large uncertainty) of available resources to a sensing device.

In some examples, when a transmitting device is signaling a resource allocation (e.g., via SCI), the transmitting device may indicate the reserved resource in the SCI (e.g., SCI-1). The transmitting device may also include a resource expansion factor $\gamma$ to indicate the ratio of the resources of the resource allocation to the resources of the reserved resource. In some examples, the transmitting device may include the resource expansion factor $\gamma$ in the second stage control (SCI-2). A sensing device may determine the resource allocation (e.g., the actual resource allocation) based on the indicated reserved resource (e.g., in SCI-1) and the resource expansion factor $\gamma$ (e.g., in SCI-2).

In some examples, the resource expansion factor $\gamma$ may be within a range. For example, the resource expansion factor $\gamma$ may be bounded by a lower bound ($\Gamma\_1$) and an upper bound (Γ_2). In some examples, the transmitting device may select the resource expansion factor γ from a set of candidate resource expansion factors. In some such examples, the transmitting device may be configured or pre-configured with the set of candidate resource expansion factors.

In some examples, to assist sensing devices in determining available resources, the transmitting device may indicate in the SCI whether the reserved resources are static or flexible (e.g., incapable or capable of being modified). When the transmitting device indicates that the reserved resources are static (e.g., resources incapable of being modified), sensing devices may determine that the reserved resources do not change. For example, when a sensing device receives an indication that a reserved resource is static (e.g., a resource incapable of being modified), the sensing device may use the indicated reserved resource to determine what other resources are available to the device for transmission. For example, referring to the example resource pool 810 of FIG. 8, if the second device 804 receives an indication that the reserved resource 810e at time T2 is static, then the second device 804 is able to determine that resources 810a to 810d and resources 810f, 810g, 810h, and 810i are available for the second device 804 to use for transmitting the packet 830 at time T2.

When the transmitting device indicates that the reserved resources are flexible (e.g., capable of being modified), sensing devices may derive a set of resources that are available based on the indicated reserved resource. For example, a sensing device may determine a maximum amount of resources that the transmitting device may use for a transmission based on the reserved resource. For example, referring to the example resource pool 810 of FIG. 8, if the second device 804 receives an indication that the reserved resource 810e at time T2 is flexible, then the second device 804 may determine a maximum amount of resources that may be used for the transmitting of the packet 840 that includes the resource 810e. For example, the second device 804 may determine that the first device 802 may use two resources (e.g., the resource 810e and 810b). The second device 804 may then determine (e.g., based on the reserved resource 810e and the indication that the reserved resource is flexible) that the resources available to the second device 804 for transmitting the packet 830 at time T2 include the resources 810a, 810c, 810d, and 810f to 810i.

Figure 10B:
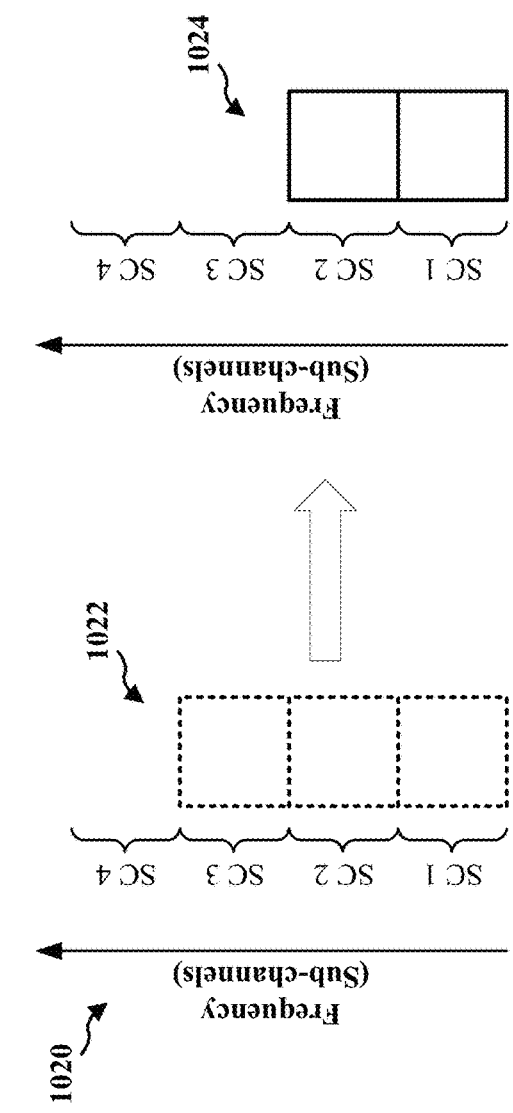
FIG. 10B is a diagram illustrating example resource adaptation in a frequency domain, in accordance with one or more of the teachings disclosed herein.

A transmitting device may perform resource adaptation (e.g., modifying a resource allocation) in the time domain and/or the frequency domain. For example, performing resource adaptation in the time domain may include modifying a resource allocation by using adjacent time slots when increasing resources or using fewer time slots when decreasing resources. FIG. 10A is a diagram 1000 illustrating example resource expansion in a time domain, in accordance with one or more of the teachings disclosed herein. For example, a transmitting device may reserve, for a transmission period, a resource 1002 comprising two sub-channels (SC 1 and SC 2) at one time slot (slot 1). Based on a change in traffic load in the transmission period, the transmitting device may perform resource expansion in the time domain and use resource allocation 1004 to transmit a packet. In the example of FIG. 10A, the transmitting device may perform resource expansion in the time domain by using the resources of the reserved resource 1002 (e.g., the two sub-channels SC1, SC2 at the time slot 1) and using resources in adjacent time slots (e.g., the time slot 2). That is, the resources used in the resource allocation 1004 may be derived from the resources of the reserved resource 1002. Additionally, a ratio of resources of the resource allocation 1004 to the resources of the reserved resource 1002 may be within a range (e.g., greater than or equal to a lower bound (Γ1) and less than or equal to an upper bound (Γ2)). In some examples, the transmitting device may include a resource expansion factor γ in the SCI (e.g., the SCI-2) indicating the change in resources for the resource allocation 1004.

Performing resource adaptation in the frequency domain may include modifying a resource allocation by using adjacent sub-channels when increasing resources or using fewer sub-channels when decreasing resources. FIG. 10B is a diagram 1020 illustrating example resource adaptation in a frequency domain by decreasing resources, in accordance with one or more of the teachings disclosed herein. For example, a transmitting device may reserve, for a transmission period, a resource 1022 comprising three sub-channels (SC 1, SC 2, and SC 3) at one time slot (slot 1). Based on a change in traffic load at the transmission period, the transmitting device may perform resource adaption in the frequency domain and use resource allocation 1024 to transmit a packet. As shown in FIG. 10B, the transmitting device may perform resource adaptation in the frequency domain by reducing the resources of the reserved resource 1022 from three sub-channels to two sub-channels (SC 1 and SC 2) in the resource allocation 1024. That is, the resources used in the resource allocation 1024 may be derived from the resources of the reserved resource 1022. Additionally, a ratio of resources of the resource allocation 1024 to the resources of the reserved resource 1022 may be within a range (e.g., greater than or equal to a lower bound (Γ1) and less than or equal to an upper bound (Γ2)). In some examples, the transmitting device may include a resource expansion factor γ of ⅔ in the SCI (e.g., the SCI-2) indicating the change in resources for the resource allocation 1024 from three sub-channels to two sub-channels.

Figure 10C:
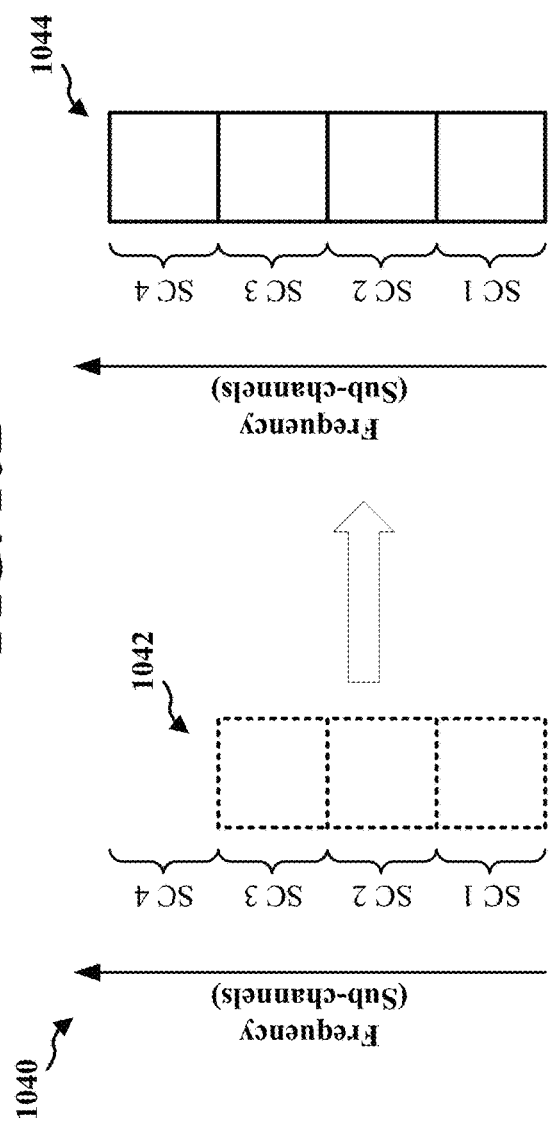
FIG. 10C is a diagram illustrating example resource expansion in a frequency domain, in accordance with one or more of the teachings disclosed herein.
Figure 10A:
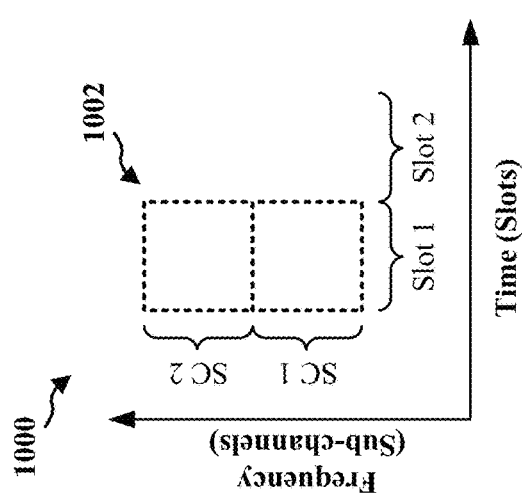
FIG. 10A is a diagram illustrating example resource expansion in a time domain, in accordance with one or more of the teachings disclosed herein.

FIG. 10C is a diagram 1040 illustrating example resource expansion in a frequency domain by increasing resources, in accordance with one or more of the teachings disclosed herein. For example, a transmitting device may reserve, for a transmission period, a resource 1042 comprising three sub-channels (SC 1, SC 2, and SC 3) at one time slot (slot 1). Based on a change in traffic load at the transmission period, the transmitting device may perform resource adaption in the frequency domain and use resource allocation 1044 to transmit a packet. As shown in FIG. 10C, the transmitting device may perform resource expansion in the frequency domain by using the resources of the reserved resource 1042 (e.g., the three sub-channels (SC 1, SC 2, and SC 3)) and using resources in adjacent sub-channels (e.g., SC 4). That is, the resources used in the resource allocation 1044 may be derived from the resources of the reserved resource 1042. Additionally, a ratio of resources of the resource allocation 1044 to the resources of the reserved resource 1042 may be within a range (e.g., greater than or equal to a lower bound (Γ1) and less than or equal to an upper bound (Γ2)). In some examples, the transmitting device may include a resource expansion factor γ of 4/3 in the SCI (e.g., the SCI-2) indicating the change in resources for the resource allocation 1044 from three sub-channels to four sub-channels.

In some examples, when the transmitting device performs resource expansion in the frequency domain, the transmitting device may also provide an indication in the SCI (e.g., SCI-2) indicating a direction of resource expansion. For example, the transmitting device may expand to sub-channels with a lower index or to sub-channels with a higher index. In the illustrated example of FIG. 10C, the transmitting device may indicate that the resource expansion is occurring to a sub-channel with a higher index (e.g., SC 4).

In some examples, the transmitting device may be unable to perform resource expansion for a transmission period. For example, the transmitting device may perform resource expansion when a priority of a packet for transmission by the transmitting device during the transmission period satisfies a priority threshold. In such examples, the transmitting device may perform resource expansion when the priority of the packet is greater than (or equal to) the priority threshold, and may forego resource expansion (e.g., for the transmission period) when the priority of the packet is less than the priority threshold. The priority threshold may be pre-configured or configured for the transmitting device (e.g., the priority threshold may be semi-static). The priority of the packet may be based on the QoS value of the data indicted in SCI (e.g., SCI-1).

In some examples, the transmitting device may perform resource expansion to an additional resource based on a sensing of resource utilization by other devices. For example, the transmitting device may perform resource expansion after determining that other devices are not using the additional resource (e.g., other devices are not predicted to use the additional resource and/or are not indicating to use the additional resource) during the transmission period.

In some examples, the transmitting device may perform resource expansion to use an additional resource based on a priority of the packet. For example, another device, such as the second device 804 of FIG. 8, may reserve the additional resource (e.g., SC 4 in the example of FIG. 10C) for the transmission period. The transmitting device, such as the first device 802 of FIG. 8, may then compare the priority of the packet 840 to the packet 830 before determining whether to perform resource expansion to the additional resource. For example, the transmitting device may determine to use the additional resource when the priority of the packet 840 is greater than the priority of the packet 830 (e.g., based on the QoS value indicated in the SCI (e.g., SCI-1) of the packet 830). Otherwise, the transmitting device may refrain from using the additional resource for the transmission period.

In some examples, when selecting an additional resource to use when performing resource expansion, the transmitting device may apply an expansion interference threshold to the additional resource and apply an interference threshold to the reserved resources. For example, referring to the illustrated example of FIG. 10C, the transmitting device may apply an interference threshold (I_1) when selecting the reserved resource 1042 (e.g., the sub-channels SC 1, SC 2, and SC 3). The transmitting device may apply an expansion interference threshold (I_2) when determining whether to expand to the adjacent sub-channel SC 4 to perform resource expansion in the frequency domain. For example, the transmitting device may determine that an interference associated with the reserved resource 1042 satisfies the interference threshold (e.g., is less than the interference threshold (I_1)) when selecting the reserved resource 1042. For the additional resource (e.g., the sub-channel SC 4), the transmitting device may determine that an interference associated with the additional resource satisfies the expansion interference threshold (e.g., the interference is less than the expansion interference threshold (I_2)).

In some examples, the interference threshold (I_1) and the expansion interference threshold (I_2) may be the same. In some examples, the interference threshold (I_1) may be different than the expansion interference threshold (I_2). For example, the interference threshold (I_1) may be greater than the expansion interference threshold (I_2). In some such examples, the transmitting device may determine not to select a resource for a resource reservation, but may use the resource for performing resource expansion. For example, an interference associated with the sub-channel SC 4 may disqualify the selection of the resource for the reserved resource 1042, but may allow the transmitting device to use the resource when selecting the resources of the resource allocation 1044.

In some examples, a reliability of a transmission using the additional resource may be less than the transmission using the reserved resources. For example, the interference associated with the additional resource may be greater than the interference associated with the reserved resources and, thus, encoded data mapped to the reserved resource may have a higher reliability than encoded data mapped to the additional resource.

In some examples, to improve the reliability of a packet (e.g., to improve the likelihood that a packet transmitted using the additional resource is successfully received by a receiving device), the transmitting device may jointly map encoded data of the packet to the reserved resource and the additional resource. That is, when mapping the encoded data, the transmitting device may not differentiate between the reserved resource and the additional resource and instead perform the mapping as if the reserved resource and the additional resource are one resource. In some such examples, it may be possible for a code block of the packet to be mapped to the additional resource and not to the reserved resource.

In some examples, when performing resource expansion in the time domain, the transmitting device may jointly map the encoded data in the time domain first and then the frequency domain. For example, the transmitting device may perform the joint mapping of the encoded data to symbols of a first sub-carrier, then to symbols of a second sub-carrier, etc. until the encoded data is mapped to the resource allocation. In some examples, mapping the encoded data in such a manner (e.g., the joint mapping of the encoded data to the symbols of a same sub-carrier first) may enable mapping each code block of a packet in the time domain to a same quantity of reserved resources and additional resources.

In some examples, when performing resource expansion in the frequency domain, the transmitting device may perform the joint mapping of the encoded data to sub-carriers of a first symbol, then to sub-carriers of a second symbol, etc. until the encoded data is mapped to the resource allocation. In some examples, mapping the encoded data in such a manner (e.g., the joint mapping of the encoded data to the sub-carriers of a same symbol first) may enable mapping each code block of a packet in the frequency domain to a same quantity of reserved resources and additional resources.

In some examples, to improve the reliability of a packet, the transmitting device may map code blocks of the packet to the reserved resource and the additional resource. For example, the transmitting device may map each of the code blocks to the reserved resource and to the additional resource, as described above in relation to performing the joint mapping of the encoded data.

In some examples, when performing resource expansion in the time domain, the transmitting device may map a code block in the frequency domain first and then the time domain. For example, the transmitting device may perform the mapping of a code block to sub-carriers of a first symbol, then to sub-carriers of a second symbol, etc. until the encoded data is mapped to the resource allocation. In some examples, the transmitting device may repeat the transmission using the additional resource.

In some examples, when performing resource expansion in the frequency domain, the transmitting device may perform the mapping of a code block to symbols of a first sub-carrier, then to symbols of a second sub-carrier, etc. until the encoded data is mapped to the resource allocation.

Figure 11:
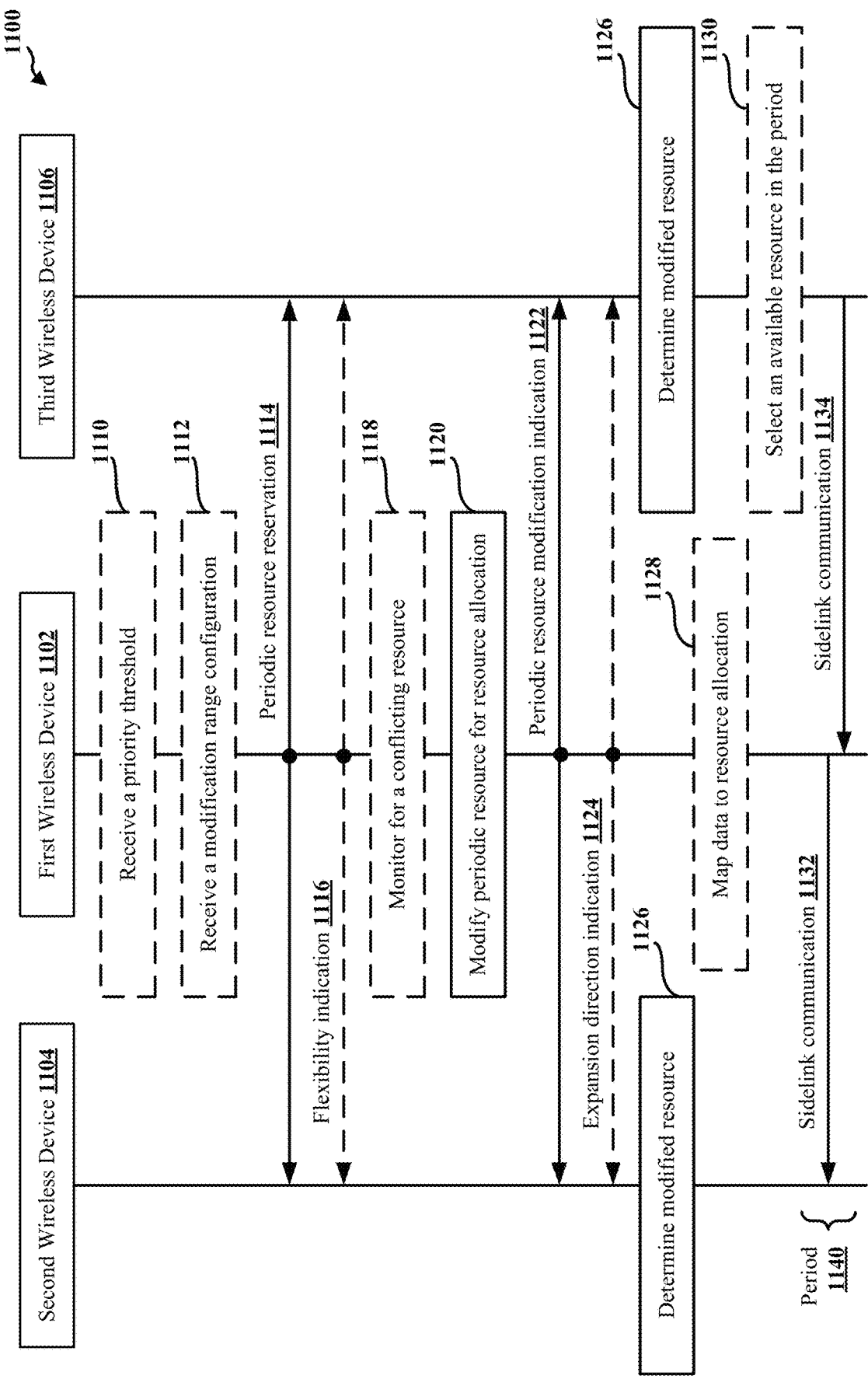
FIG. 11 is an example communication flow between a first device and a second device involved in sidelink communication, in accordance with one or more of the teachings disclosed herein.

FIG. 11 is an example communication flow 1100 between a first wireless device 1102, a second wireless device 1104, and a third wireless device 1106. The communication may be based on sidelink. In some examples, the communication may be based on sidelink communication that is exchanged directly between the first wireless device 1102, the second wireless device 1104, and/or the third wireless device 1106. In some examples, the first wireless device 1102, the second wireless device 1104, and/or the third wireless device 1106 may be a UE.

Aspects of the wireless devices 1102, 1104, 1106 may be implemented by the UE 104, 402, 404, 406, 408, the device 310 or 350, the RSU 107, 407, and/or the devices 802, 804. Although not shown in the illustrated example of FIG. 11, in additional or alternative examples, the first wireless device 1102, the second wireless device 1104, and/or the third wireless device 1106 may be in communication with one or more other wireless devices and/or base stations.

In the illustrated example of FIG. 11, the first wireless device 1102 is a transmitting device that modifies periodic resources, based on aperiodic or varying data traffic, for transmitting a sidelink communication 1132 to the second wireless device 1104 at a period 1140. The second wireless device 1104 is a receiving device that receives the sidelink communication 1132 at the period 1140 based on modified periodic resources. The third wireless device 1106 is a sensing device that selects available resources during the period 1140 based on modified periodic resources. However, it may be appreciated that for a transmission period, the first wireless device 1102, the second wireless device 1104, and/or the third wireless device 1106 may be a transmitting device or a receiving device. For example, and referring to the example timeline 800 of FIG. 8, during time T1, the first device 802 is a transmitting device and the second device 804 is a receiving device, and during time T2, the devices 802, 804 are transmitting devices.

At 1110, the first wireless device 1102 may receive a priority threshold. In some examples, the first wireless device 1102 may use the priority threshold when determining whether to perform resource expansion and to add an additional resource to a periodic resource. For example, the first wireless device 1102 may compare a priority (e.g., a QoS value) of data to the priority threshold. The first wireless device 1102 may determine to modify a periodic resource by increasing resources when the priority of the data satisfies the priority threshold (e.g., the priority of the data is greater than or equal to the priority threshold). Otherwise (e.g., when the priority of the data does not satisfy the priority threshold), the first wireless device 1102 may skip modifying the periodic resource for the transmission period.

In some examples, the first wireless device 1102 may be pre-configured with the priority threshold. In some examples, the first wireless device 1102 may receive the priority threshold from another device, such as a base station or another wireless device.

At 1112, the first wireless device 1102 may receive a modification range configuration. The first wireless device 1102 may use the modification range configuration to determine how much modification to a periodic resource may be applied (e.g., is acceptable). In some examples, the modification range configuration may include a lower bound ($\Gamma\_1$) and/or an upper bound ($\Gamma\_2$). The lower bound ($\Gamma\_1$) may be configured to be less than or equal to one. The upper bound ($\Gamma\_2$) may be configured to be greater than or equal to one. As described above, the first wireless device 1102 may increase or decrease a periodic resource such that a ratio of resources of a resource allocation to the resources of the periodic resource satisfies the modification range (e.g., the range [$\Gamma\_1, \Gamma\_2$]).

In some examples, the modification range configuration may include a set of resource expansion factors $\gamma$. For example, the set of resource expansion factors $\gamma$ may include one or more values that satisfy the modification range (e.g., the range [$\Gamma\_1, \Gamma\_2$]). The resource expansion factor $\gamma$ may enable the first wireless device 1102 to indicate whether the first wireless device 1102 is modifying a periodic resource by increasing resources (e.g., by applying a resource expansion factor $\gamma$ that is greater than one), or by decreasing resources (e.g., by applying a resource expansion factor $\gamma$ that is less than one).

In some examples, the modification range configuration may include an expansion interference threshold ($I\_2$). The first wireless device 1102 may use the expansion interference threshold ($I\_2$) to determine whether to include an additional resource candidate when performing resource expansion. For example, the first wireless device 1102 may determine to use the additional resource candidate when interference associated with the additional resource candidate satisfies the expansion interference threshold ($I\_2$). The expansion interference threshold ($I\_2$) may the same or different than an interference threshold ($I\_1$). In some examples, the first wireless device 1102 may use the interference threshold ($I\_1$) when selecting resources for a periodic resource reservation and may use the expansion interference threshold ($I\_2$) when determining whether to use an additional resource candidate when performing resource expansion.

In some examples, the first wireless device 1102 may be pre-configured with the modification range configuration. In some examples, the first wireless device 1102 may receive the modification range configuration from another device, such as a base station or another wireless device.

In the example of FIG. 11, the first wireless device 1102 transmits a periodic resource reservation 1114 for sidelink transmission that is received by the second wireless device 1104 and the third wireless device 1106. The periodic resource reservation 1114 may facilitate reserving one or more resources for use by the first wireless device 1102 during subsequent transmissions. For example, and referring to the example of FIG. 8, the periodic resource reservation 1114 may enable the first wireless device 1102 to reserve the resource 810e during time T2 and to reserve the resource 810b during time T3. The first wireless device 1102 may transmit the periodic resource reservation 1114 using SCI.

The second wireless device 1104 and/or the third wireless device 1106 may use the periodic resource reservation 1114 to determine what resources are available to the respective wireless devices 1104, 1106 to use for transmitting a sidelink communication. For example, and referring to the example of FIG. 8, based on the periodic resource reservation 1114, the third wireless device 1106 may determine that during the time T2, the resource 810e of the resource pool 810 is not available to the third wireless device 1106 to use for transmitting the packet 830. Instead, the third wireless device 1106 may determine to select a resource from the remaining resources of the resource pool 810 to transmit the packet 830.

In some examples, the first wireless device 1102 may transmit a flexibility indication 1116 that is received by the second wireless device 1104 and the third wireless device 1106. The flexibility indication 1116 may indicate to the second wireless device 1104 and/or the third wireless device 1106 whether the periodic resource reservation 1114 is static or flexible (e.g., incapable or capable of being modified). For example, the flexibility indication 1116 may include a static indication when the periodic resource reservation 1114 is incapable of being modified. Otherwise, the flexibility indication 1116 may include a flexible indication when the periodic resource reservation 1114 may be modified. In some examples, the second wireless device 1104 and/or the third wireless device 1106 may apply a configured flexibility to the periodic resource reservation 1114 unless indicated otherwise. For example, the wireless devices 1104, 1106 may determine that the periodic resource reservation 1114 is static unless the flexibility indication 1116 indicates that the periodic resource reservation 1114 is flexible. In other examples, the wireless devices 1104, 1106 may determine that the periodic resource reservation 1114 is flexible unless the flexibility indication 1116 indicates that the periodic resource reservation 1114 is static. The first wireless device 1102 may transmit the flexibility indication 1116 in SCI, such as SCI-2.

At 1120, the first wireless device 1102 modifies a periodic resource for a resource allocation for transmitting the sidelink communication 1132 at the period 1140. The first wireless device 1102 may modify a periodic resource in the time domain or in the frequency domain. In some examples, the first wireless device 1102 may modify a periodic resource by decreasing the amount of resources for the sidelink communication 1132. For example, and referring to the example diagram 900 of FIG. 9, the first wireless device 1102 may reserve the first resource 910 to use during the time T1, but may use the resource allocation 912 comprising fewer resources than the first resource 910 when transmitting a sidelink communication during the time T1 (e.g., when transmitting the sidelink communication 1132 at the period 1140).

In other examples, the first wireless device 1102 may modify a periodic resource by increasing the amount of resources for the sidelink communication 1132. For example, and referring to the example diagram 900 of FIG. 9, the first wireless device 1102 may reserve the second resource 920 to use during the time T2, but may use the resource allocation 922 comprising more resources than the second resource 920 when transmitting a sidelink communication during the time T2 (e.g., when transmitting the sidelink communication 1132 at the period 1140).

In some examples, the first wireless device 1102 may limit the amount of change between the resource allocation and the periodic resource such that a resource ratio of the resource allocation to the periodic resource is within a range. For example, the first wireless device 1102 may use fewer resources than the first resource 910 at the time T1 so long as the resource ratio of the resource allocation 912 to the first resource 910 satisfies a lower bound ($\Gamma\_1$) and an upper bound ($\Gamma\_2$). Similarly, the first wireless device 1102 may use more resources than the second resource 920 at the time T2 so long as the resource ratio of the resource allocation 922 to the second resource 920 satisfies a lower bound ($\Gamma\_1$) and an upper bound ($\Gamma\_2$). As described above, the first wireless device 1102 may receive the lower bound ($\Gamma\_1$) and/or the upper bound ($\Gamma\_2$) via the modification range configuration (e.g., at 1112).

In some examples, the amount of change between the resource allocation and the periodic resource may be based on a resource expansion factor $\gamma$. For example, when determining to reduce resources for the sidelink communication 1132, the first wireless device 1102 may apply a resource expansion factor $\gamma$ that is less than one. In other examples, when determining to increase resources for the sidelink communication 1132, the first wireless device 1102 may apply a resource expansion factor $\gamma$ that is greater than one. As described above, the first wireless device 1102 may receive the resource expansion factor $\gamma$ via the modification range configuration (e.g., at 1112).

In some examples, the first wireless device 1102 may derive the resources of a resource allocation from the periodic resource. For example, when decreasing resources for the sidelink communication 1132, the first wireless device 1102 may select a subset of the first resource 910 for the resource allocation 912. When increasing resources for the sidelink communication 1132, the first wireless device 1102 may first use the second resource 920 and then add an additional resource (or resources) for the resource allocation 922.

When increasing resources, the first wireless device 1102 may perform the resource expansion in the time domain and/or the frequency domain. For example, the first wireless device 1102 may perform resource expansion in the time domain by using adjacent slot(s), as shown in the illustrated example of FIG. 10A. The first wireless device 1102 may perform resource expansion in the frequency domain by using adjacent sub-channel(s), as shown in the illustrated example of FIG. 10C.

In some examples, before performing resource expansion, the first wireless device 1102 may compare a priority of the sidelink communication 1132 to a priority threshold. As described above, the first wireless device 1102 may receive the priority threshold (e.g., at 1110). When the priority of the sidelink communication 1132 fails to satisfy (e.g., does not satisfy) the priority threshold, the first wireless device 1102 may forego (or skip) performing the resource expansion for the transmission period (e.g., the period 1140). Otherwise (e.g., when the priority of the sidelink communication 1132 satisfies the priority threshold), the first wireless device 1102 may determine to perform the resource expansion.

In some examples, when selecting an additional resource for performing the resource expansion, the first wireless device 1102 may first determine whether the additional resource conflicts with another resource. For example, at 1118, the first wireless device 1102 may monitor for a conflicting resource. The first wireless device 1102 may apply sensing or partial-sensing techniques to determine whether an additional resource candidate conflicts with a resource reservation by another wireless device (e.g., the second wireless device 1104 and/or the third wireless device 1106). In some examples, when the first wireless device 1102 determines that the additional resource candidate is available (e.g., determines an absence of a conflicting resource reservation or that the additional resource candidate does not conflict with another resource reservation), the first wireless device 1102 may determine to use the additional resource candidate when performing the resource expansion.

In some examples in which the first wireless device 1102 determines that the additional resource candidate conflicts with another resource reservation, the first wireless device 1102 may compare a priority of the sidelink communication

1132 with a priority of the sidelink communication associated with the conflicting resource reservation. For example, when the priority of the sidelink communication 1132 is greater than the priority of the other sidelink communication, the first wireless device 1102 may determine to use the additional resource candidate. Otherwise (e.g., when the priority of the sidelink communication 1132 is less than the priority of the other sidelink communication), the first wireless device 1102 may determine to skip using the additional resource candidate when performing the resource expansion.

In some examples, when the first wireless device 1102 is determining whether to use an additional resource candidate, the first wireless device 1102 may determine an interference associated with the additional resource candidate and compare the determined interference to an expansion interference threshold (I_2). For example, when the determined interference satisfies the expansion interference threshold (I_2), the first wireless device 1102 may determine to use the additional resource candidate. Otherwise (e.g., when the determined interference does not satisfy the expansion interference threshold (I_2)), the first wireless device 1102 may determine to forego using the additional resource candidate. As described above, the first wireless device 1102 may receive the expansion interference threshold (I_2) via the modification range configuration (e.g., at 1112).

In the illustrated example of FIG. 11, the first wireless device 1102 transmits a periodic resource modification indication 1122 that is received by the second wireless device 1104 and the third wireless device 1106. The first wireless device 1102 may transmit the periodic resource modification indication 1122 in SCI. In some examples, the first wireless device 1102 may transmit a resource allocation in the first portion of SCI (e.g., SCI-1) using PSCCH. For example, the first wireless device 1102 may transmit the resource allocation 1004 of FIG. 10A, the resource allocation 1024 of FIG. 10B, or the resource allocation 1044 of FIG. 10C in the SCI. The wireless devices 1104, 1106 receiving the periodic resource modification indication 1122 may use the resource allocation as a reserved resource when determining what resource candidates are available to the respective wireless devices 1104, 1106. In some such examples, the first wireless device 1102 may forego transmitting a periodic resource reservation.

In some examples, the first wireless device 1102 may transmit the resource expansion factor γ in the second portion of SCI (e.g., SCI-2) using PSSCH. The resource expansion factor γ may signal the resource ratio of the resource allocation to the periodic resource.

In some examples, the first wireless device 1102 may transmit an expansion direction indication 1124 that is received by the second wireless device 1104 and the third wireless device 1106. For example, the first wireless device 1102 may transmit the expansion direction indication 1124 when the first wireless device 1102 performs resource expansion in the frequency domain. The expansion direction indication 1124 may indicate whether the first wireless device 1102 is expanding to a lower channel sub-channel or to a higher index sub-channel. The first wireless device 1102 may transmit SCI (e.g., SCI-2) including the expansion direction indication 1124.

At 1126, the second wireless device 1104 and the third wireless device 1106 determine the modified resource for the sidelink communication 1132. For example, the receiving wireless devices (e.g., the wireless devices 1104, 1106) may use the periodic resource reservation 1114, the flexibility indication 1116, the periodic resource modification indication 1122, and/or the expansion direction indication 1124 to determine the modified resource. For example, the wireless devices 1104, 1106 may receive the periodic resource reservation 1114 identifying the reserved resource 1042 of FIG. 10C including three sub-channels (e.g., SC 1, SC 2, and SC 3) of a time slot that are reserved by the first wireless device 1102. The flexibility indication 1116 may indicate that the periodic resource reservation 1114 is flexible (e.g., capable of being modified). The periodic resource modification indication 1122 may include a resource expansion factor γ of ⁴⁄₃ indicating that the modified resource includes more resources than the periodic resource reservation 1114. The expansion direction indication 1124 may indicate that the resource expansion is to a sub-channel with a higher index (e.g., SC 4). The wireless devices 1104, 1106 may use the received information (e.g., the periodic resource reservation 1114, the flexibility indication 1116, the periodic resource modification indication 1122, the expansion direction indication 1124) to determine that the modified resource (e.g., the resource allocation 1044 of FIG. 10C) includes four sub-channels (e.g., SC 1, SC 2, SC 3, and SC 4) in the one time slot.

At 1128, the first wireless device 1102 may map data of the sidelink communication 1132 to the resource allocation. For example, the first wireless device 1102 may jointly map the data to the periodic resource and the additional resource. In some examples, when performing resource expansion in the time domain, the first wireless device 1102 may jointly map the encoded data in the time domain first and then the frequency domain. For example, the first wireless device 1102 may perform the mapping of the encoded data to symbols of a first sub-carrier, then to symbols of a second sub-carrier, etc. until the encoded data is mapped to the resource allocation. In some examples, when performing resource expansion in the frequency domain, the first wireless device 1102 may perform the joint mapping of the encoded data to sub-carriers of a first symbol, then to sub-carriers of a second symbol, etc. until the encoded data is mapped to the resource allocation.

In some examples, the first wireless device 1102 may map code blocks of the sidelink communication 1132 to the periodic resource and to the additional resource. In some examples, when performing the resource expansion in the time domain, the first wireless device 1102 may map a code block in the frequency domain first and then in the time domain. For example, the first wireless device 1102 may perform the mapping of a code block to sub-carriers of a first symbol, then to sub-carriers of a second symbol, etc. until the encoded data is mapped to the resource allocation. In some examples, the first wireless device 1102 may repeat the transmission using the additional resource. In some examples, when performing resource expansion in the frequency domain, the first wireless device 1102 may perform the mapping of a code block to symbols of a first sub-carrier, then to symbols of a second sub-carrier, etc. until the encoded data is mapped to the resource allocation.

As shown in FIG. 11, the first wireless device 1102 transmits the sidelink communication 1132 that is received by the second wireless device 1104. The first wireless device 1102 transmits the sidelink communication 1132 at the period 1140 using the resource allocation. For example, the first wireless device 1102 may use the modified periodic resource to transmit the sidelink communication 1132. The second wireless device 1104 may use the determined modified resource (e.g., at 1126) to receive the sidelink communication 1132 at the period 1140.

In some examples, one or more wireless devices may transmit during a same transmission period. For example, the first wireless device 1102 transmits the sidelink communication 1132 at the period 1140 and the third wireless device 1106 may also transmit a sidelink communication 1134 at the period 1140. Before transmitting the sidelink communication 1134, the third wireless device 1106 may determine which resources of a resource pool are available. For example, the third wireless device 1106 may use the determined modified resource (e.g., at 1126) to determine the available resources during the period 1140. At 1130, the third wireless device 1106 may select an available resource in the period 1140. For example, the third wireless device 1106 may select an available resource based on the periodic resource modification performed by the first wireless device 1102 (e.g., at 1120) and based on the received information (e.g., the periodic resource reservation 1114, the flexibility indication 1116, the periodic resource modification indication 1122, the expansion direction indication 1124).

As shown in FIG. 11, the third wireless device 1106 may transmit the sidelink communication 1134. The third wireless device 1106 may transmit the sidelink communication 1134 at the period 1140 using the selected available resource. In the illustrated, the first wireless device 1102 receives the sidelink communication 1134 from the third wireless device 1106 during the period 1140. However, in other examples, the third wireless device 1106 may transmit the sidelink communication 1134 to the second wireless device 1104 and/or to another wireless device.

Figure 12:
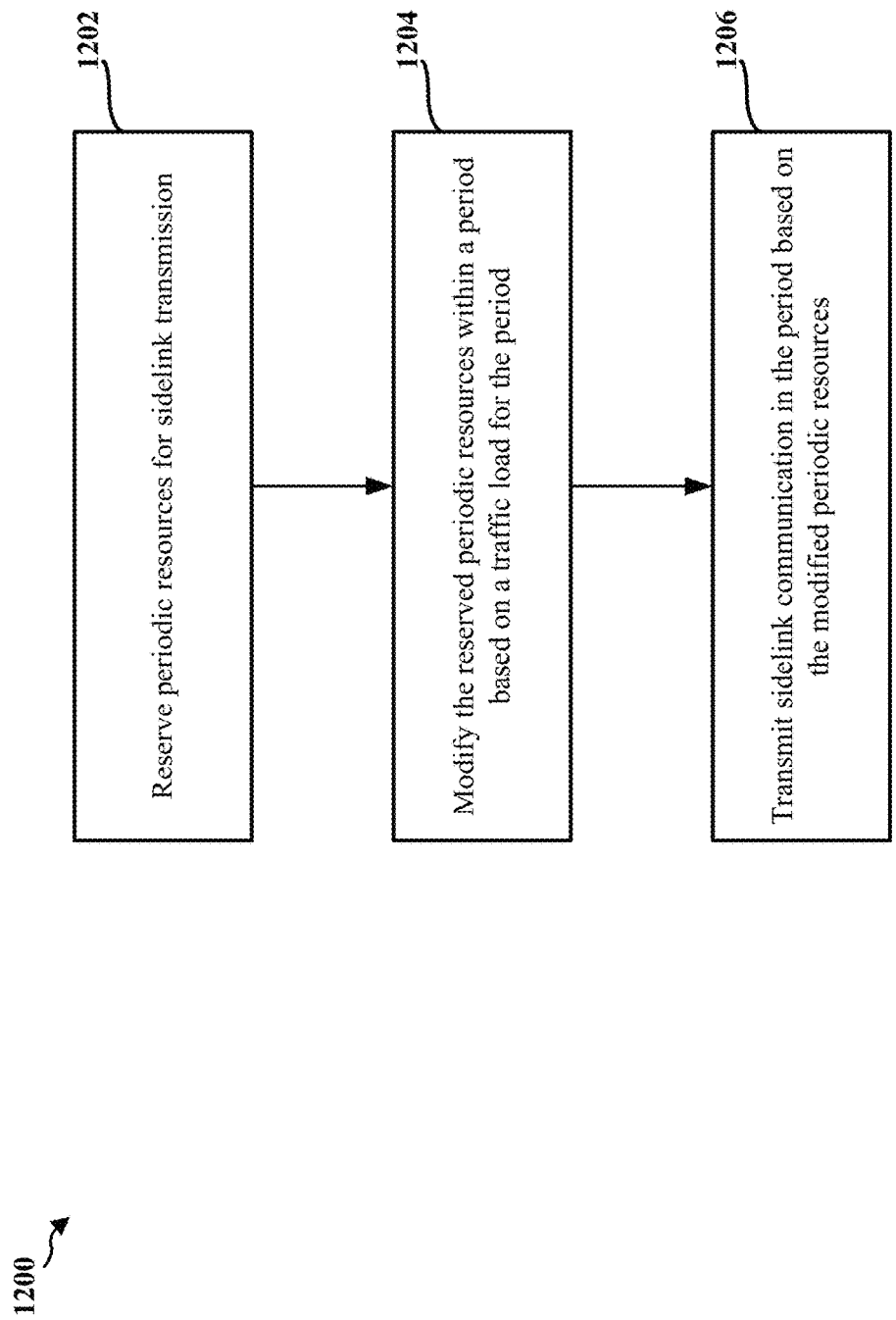
FIG. 12 is a flowchart of a first example method of wireless communication at a wireless device, in accordance with the teachings disclosed herein.

FIG. 12 is a flowchart 1200 of a method of wireless communication. The method may be performed by a wireless device (e.g., the transmitting or first wireless device 1102, and/or an apparatus 1602 of FIG. 16). For example, the method may be performed by a UE (e.g., the UE 104, 402, 404, 406, 408), a wireless communication device (e.g., the device 310 or 350, and/or the devices 802, 804), and/or an RSU (e.g., the RSU 107, 407). The method of FIG. 12 enables a wireless device to use a periodic resource reservation for varying data traffic. Aspects enable the wireless device to increase or decrease the reserved resources based on current data traffic.

At 1202, the wireless device reserves periodic resources for sidelink transmission, as described above in connection with the periodic resource reservation 1114 of FIG. 11. For example, 1202 may be performed by a reservation component 1640 of the apparatus 1602 of FIG. 16. The reservation may include any of the aspects of resource reservation described in connection with FIGS. 5A, 5B, and/or 6.

At 1204, the wireless device modifies the reserved periodic resources within a period based on a traffic load for the period, as described in connection with 1120 of FIG. 11. For example, 1204 may be performed by a modification component 1642 of the apparatus 1602 of FIG. 16. Modifying the reserved periodic resources may include reducing or increasing the resources. The wireless device may modify the reserved periodic resources so that a ratio of the modified periodic resources to the reserved periodic resources for the sidelink transmission is within a range. In some examples, the range may include a lower bound ($\Gamma\_1$) that is less than or equal to one. The range may additionally, or alternatively, include an upper bound ($\Gamma\_2$) that is greater than or equal to one.

At 1206, the wireless device transmits sidelink communication in the period based on the modified periodic resources, as described in connection with the sidelink communication 1132 of FIG. 11. For example, 1206 may be performed by a sidelink communication component 1644 of the apparatus 1602 in FIG. 16. The transmission may include any of the aspects described in connection with FIGS. 1 to 11, for example.

Figure 13:
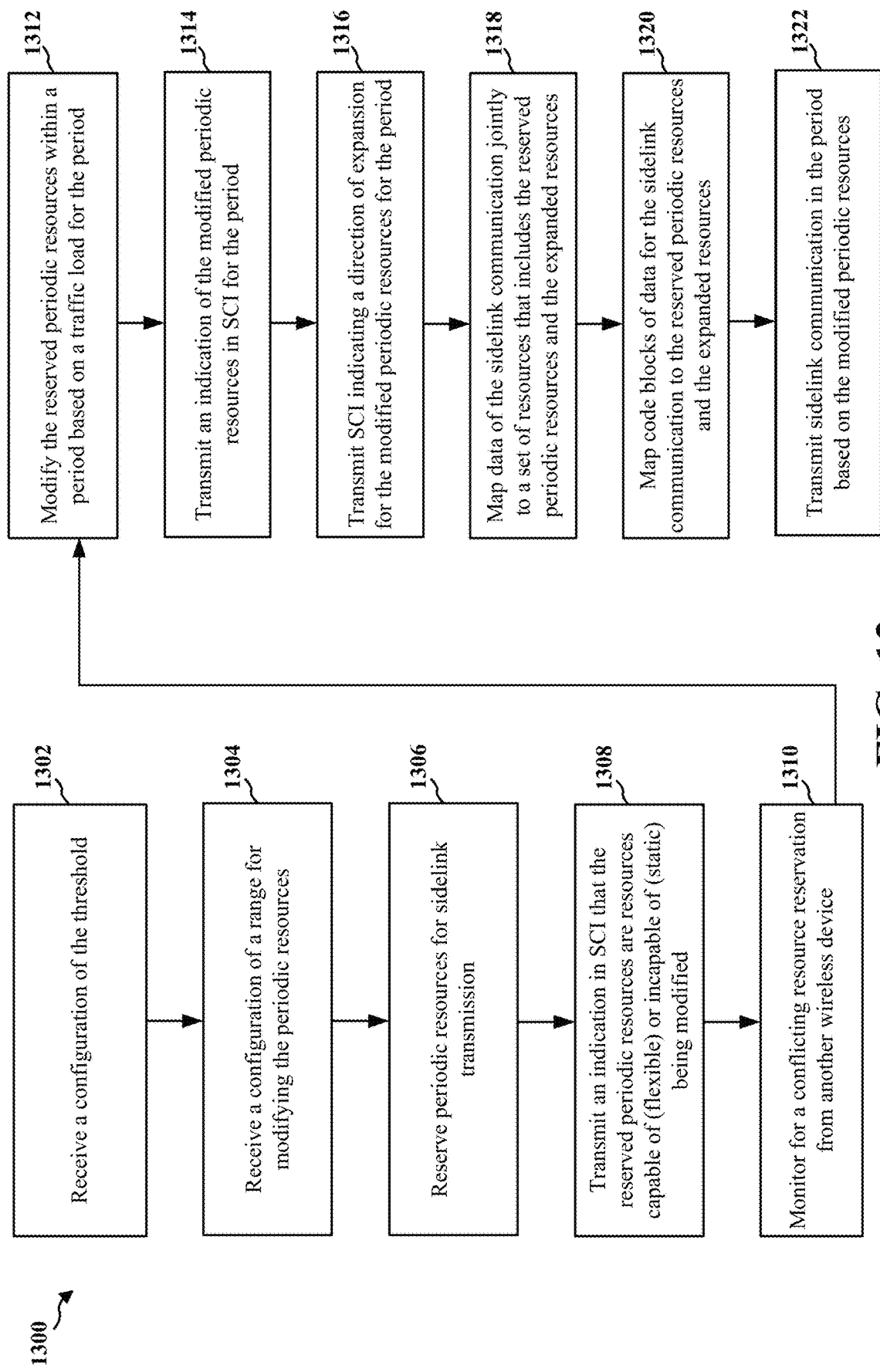
FIG. 13 is a flowchart of a second example method of wireless communication at a wireless device, in accordance with the teachings disclosed herein.

FIG. 13 is a flowchart 1300 of a method of wireless communication. The method may be performed by a wireless device (e.g., the transmitting or first wireless device 1102, and/or an apparatus 1602 of FIG. 16). For example, the method may be performed by a UE (e.g., the UE 104, 402, 404, 406, 408), a wireless communication device (e.g., the device 310 or 350, and/or the devices 802, 804), and/or an RSU (e.g., the RSU 107, 407). The method of FIG. 13 enables a wireless device to use a periodic resource reservation for varying data traffic. Aspects enable the wireless device to increase or decrease the reserved resources based on current data traffic.

At 1306, the wireless device reserves periodic resources for sidelink transmission, as described above in connection with the periodic resource reservation 1114 of FIG. 11. For example, 1306 may be performed by a reservation component 1640 of the apparatus 1602 of FIG. 16. The reservation may include any of the aspects of resource reservation described in connection with FIGS. 5A, 5B, and/or 6.

At 1312, the wireless device modifies the reserved periodic resources within a period based on a traffic load for the period, as described in connection with 1120 of FIG. 11. For example, 1312 may be performed by a modification component 1642 of the apparatus 1602 of FIG. 16. Modifying the reserved periodic resources may include reducing or increasing the resources. The wireless device may modify the reserved periodic resources so that a ratio of the modified periodic resources to the reserved periodic resources for the sidelink transmission is within a range. As illustrated at 1304, the wireless device may receive a configuration of the range for modifying the reserved periodic resources, as described above in connection with 1112 of FIG. 11. For example, 1304 may be performed by a configuration component 1646 of the apparatus 1602 of FIG. 16. The wireless device may apply scheduling restrictions in some examples. For example, if the modified periodic resources comprise fewer resources than the reserved periodic resources for the period, the wireless device may modify the reserved periodic resources for the period so that the modified periodic resources are contained within the reserved periodic resources. If the modified periodic resources comprise more resources than the reserved periodic resources for the period, the wireless device may modify the reserved periodic resources for the period so that the reserved periodic resources are contained within the modified periodic resources. In some examples, the wireless device may modify the reserved periodic resources to expand the reserved periodic resources for the period, at 1312, based on an interference level for expanding period resource reservations.

Modifying the reserved periodic resources within the period, at 1312, may include increasing or decreasing the reserved periodic resources within the period in one or more of a time domain or a frequency domain. The modification may be performed, e.g., by the modification component 1642 of the apparatus 1602 in FIG. 16. As illustrated at 1316, the wireless device may transmit SCI indicating a direction of expansion for the modified periodic resources for the period, as described above in connection with the expansion direction indication 1124 of FIG. 11. For example, 1316 may be performed by an SCI component 1648 of the apparatus 1602 of FIG. 16. The direction may include one or more of a first direction in the time domain or a second direction in the frequency domain.

The wireless device may modify the periodic resources, e.g., at 1312, to expand the periodic resources for the period based on a priority level of the sidelink communication meeting a threshold. The modification may be performed, e.g., by the modification component 1642 of the apparatus 1602 in FIG. 16. As illustrated at 1302, the wireless device may receive a configuration of the threshold, as described above in connection with 1110 of FIG. 11. For example, 1302 may be performed by a configuration component 1646 of the apparatus 1602 of FIG. 16.

As illustrated at 1310, the wireless device may monitor for a conflicting resource reservation from another wireless device, as described above in connection with 1118 of FIG. 11. For example, 1310 may be performed by a monitor component 1650 of the apparatus 1602 of FIG. 16. The wireless device may modify the periodic resources to expand the periodic resources for the period, at 1312, based on the wireless device not detecting a conflicting resource reservation (e.g., determining an absence of a conflicting resource reservation).

The wireless device may transmit, at 1314, an indication of the modified periodic resources in SCI for the period, as described above in connection with the periodic resource modification indication 1122 of FIG. 11. For example, 1314 may be performed by an SCI component 1648 of the apparatus 1602 of FIG. 16. For example, as part of reserving the periodic resources at 1306, the wireless device may transmit a first indication of the periodic resources in SCI for the period. The wireless device may transmit a second indication of a factor indicating a ratio of the of the modified periodic resources for the period to the periodic resources that were reserved for the sidelink transmission, e.g., at 1314. The first indication may be comprised in a first portion of the SCI that is transmitted on a PSCCH, and the second indication may be comprised in a second portion of the SCI that is transmitted on a PSSCH. The second indication may be based on a configured candidate value.

As illustrated at 1308, the wireless device may transmit an indication in SCI that the reserved periodic resources are resources capable of being modified, as described above in connection with the flexibility indication 1116 of FIG. 11. For example, 1308 may be performed by the SCI component 1648 of the apparatus 1602 of FIG. 16. The wireless device may provide a static indication in the SCI for periodic resource reservations that are incapable (e.g., not capable) of being modified.

Modifying the periodic resources for the period may include expanding the periodic resources to include expanded resources. As illustrated at 1318, the wireless device may map data of the sidelink communication jointly to a set of resources that includes the periodic resources and the expanded resources, as described above in connection with 1128 of FIG. 11. For example, 1318 may be performed by a map component 1652 of the apparatus 1602 of FIG. 16. For example, the wireless device may treat the expanded and reserved resources as a combined set of resources and may encode the data payload by jointly mapping to the combined resource.

Modifying the reserved periodic resources for the period may include expanding the reserved periodic resources to include expanded resources. As illustrated at 1320, the wireless device may map code blocks of data for the sidelink communication to the periodic resources and the expanded resources, as described above in connection with 1128 of FIG. 11. For example, 1320 may be performed by the map component 1652 of the apparatus 1602 of FIG. 16. For example, each code block of the data may be mapped to the reserved periodic resources and the expanded resources. The wireless device may map each code block of a transport block uniformly to the expanded and reserved resources. For example, if the expansion is in the time domain to include an additional slot, the wireless device may repeat the transmission in the expanded slot. To spread the code blocks of the transport block across the initial resources and the expanded resources, if the expansion is in the time domain, the wireless device may map in a time first manner rather than a frequency first manner. Similarly, if the expansion is in the frequency domain, the wireless device may map the code blocks in a frequency first manner.

At 1322, the wireless device transmits sidelink communication in the period based on the modified periodic resources, as described above in connection with the sidelink communication 1132 of FIG. 11. For example, 1322 may be performed by a sidelink communication component 1644 of the apparatus 1602 of FIG. 16. The transmission may include any of the aspects described in connection with FIGS. 1 to 11, for example.

Figure 14:
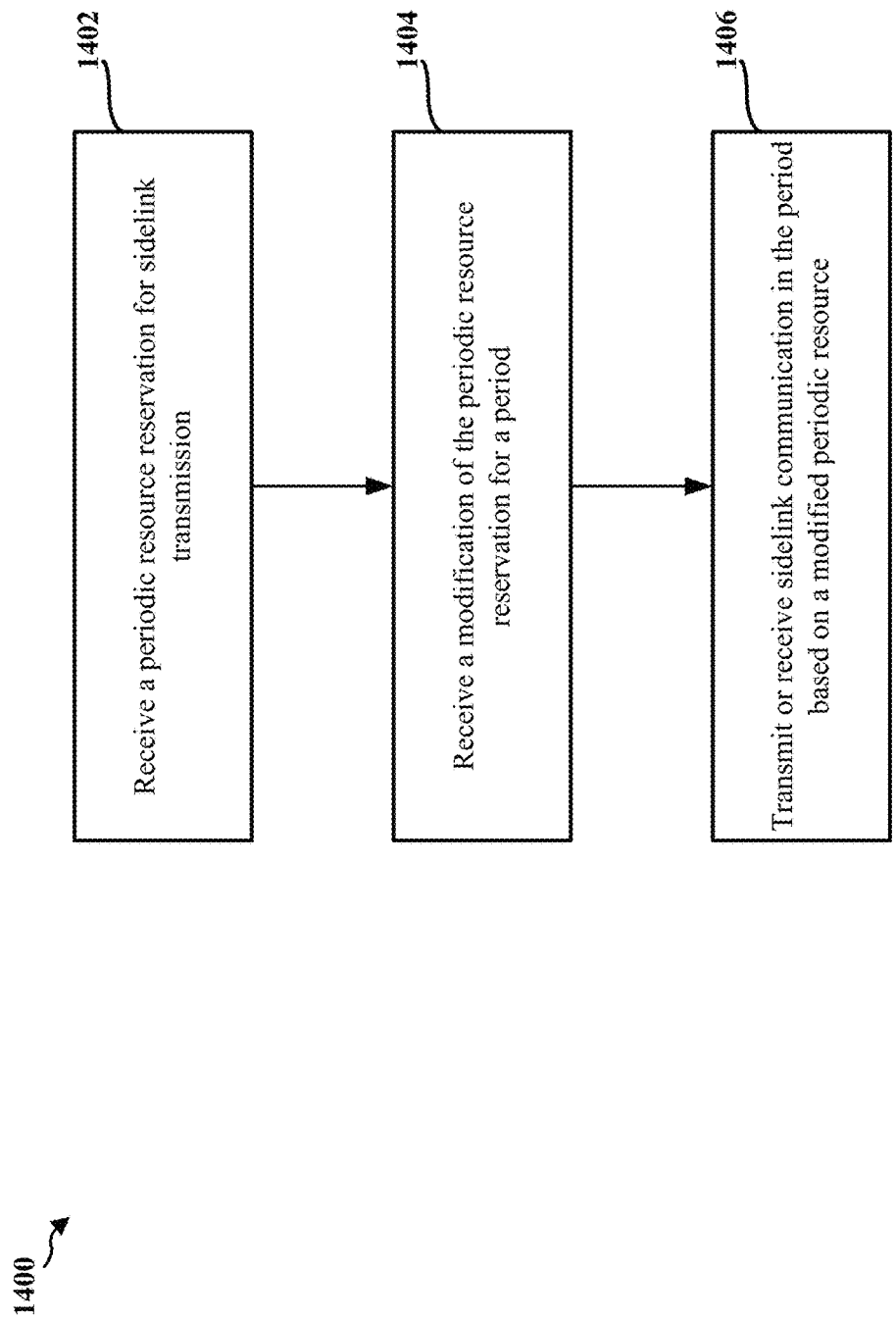
FIG. 14 is a flowchart of a third example method of wireless communication at a wireless device, in accordance with the teachings disclosed herein.

FIG. 14 is a flowchart 1400 of a method of wireless communication. The method may be performed by a wireless device (e.g., the second wireless device 1104, the third wireless device 1106, and/or an apparatus 1602 of FIG. 16). For example, the method may be performed by a UE (e.g., the UE 104, 402, 404, 406, 408), a wireless communication device (e.g., the device 310 or 350, and/or the devices 802, 804), and/or an RSU (e.g., the RSU 107, 407). The method of FIG. 14 enables a wireless device to use a periodic resource reservation for varying data traffic. Aspects enable the wireless device to increase or decrease the reserved resources based on current data traffic.

At 1402, the wireless device receives a periodic resource reservation for sidelink transmission, as described above in connection with the periodic resource reservation 1114 of FIG. 11. For example, 1402 may be performed by a reservation component 1640 of the apparatus 1602 of FIG. 16.

At 1404, the wireless device receives a modification of the periodic resource reservation for a period, as described above in connection with the periodic resource modification indication 1122 of FIG. 11. For example, 1404 may be performed by a modification component 1642 of the apparatus 1602 of FIG. 16. The modification may include reduced resources or increased resources for the period. The modification of the periodic resource reservation may be received in SCI for the period.

At 1406, the wireless device transmits or receives sidelink communication in the period based on a modified periodic resource, as described above in connection with the sidelink communications 1132, 1134 of FIG. 11. For example, 1406 may be performed by a sidelink communication component 1644 of the apparatus 1602 of FIG. 16.

Figure 15:
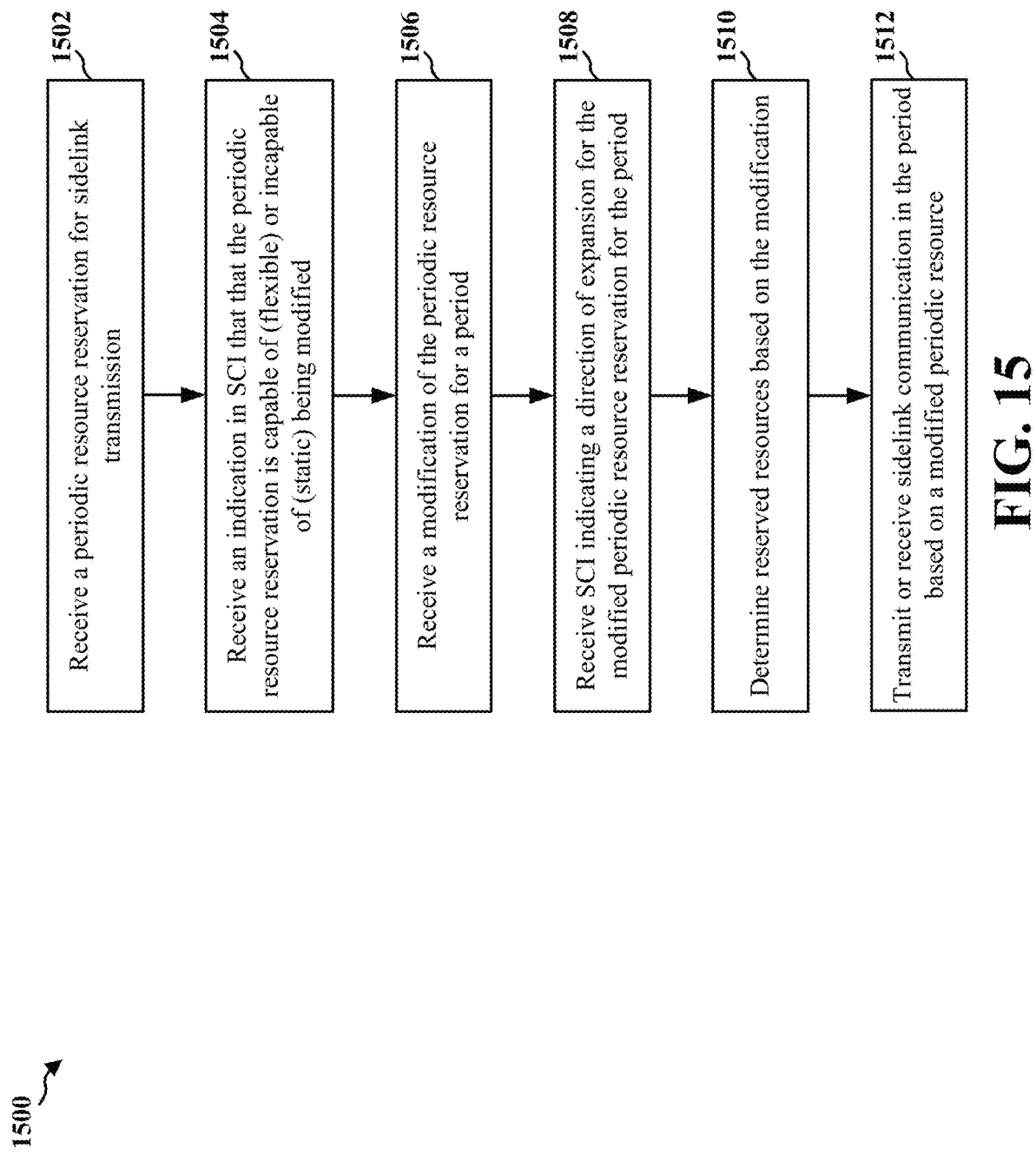
FIG. 15 is a flowchart of a fourth example method of wireless communication at a wireless device, in accordance with the teachings disclosed herein.

FIG. 15 is a flowchart 1500 of a method of wireless communication. The method may be performed by a wireless device (e.g., the second wireless device 1104, the third wireless device 1106, and/or an apparatus 1602 of FIG. 16). For example, the method may be performed by a UE (e.g., the UE 104, 402, 404, 406, 408), a wireless communication device (e.g., the device 310 or 350, and/or the devices 802, 804), and/or an RSU (e.g., the RSU 107, 407). The method of FIG. 15 enables a wireless device to use a periodic resource reservation for varying data traffic. Aspects enable the wireless device to increase or decrease the reserved resources based on current data traffic.

At 1502, the wireless device receives a periodic resource reservation for sidelink transmission, as described in connection with as described above in connection with the periodic resource reservation 1114 of FIG. 11. For example, 1502 may be performed by a reservation component 1640 of the apparatus 1602 of FIG. 16.

As illustrated at 1504, the wireless device may receive an indication in SCI that the periodic resource reservation is capable of being modified, as described above in connection with the flexibility indication 1116 of FIG. 11. For example, 1504 may be performed by an SCI component 1648 of the apparatus 1602 of FIG. 16. For example, the wireless device may receive a static indication in the SCI for periodic resource reservations that are incapable (e.g., not capable) of being modified.

At 1506, the wireless device receives a modification of the periodic resource reservation for a period, as described above in connection with the periodic resource modification indication 1122 of FIG. 11. For example, 1506 may be performed by a modification component 1642 of the apparatus 1602 of FIG. 16. The modification may include reduced resources or increased resources for the period. The modification of the periodic resource reservation may be received in SCI for the period. For example, at 1506, the wireless device may receive a first indication of the periodic resource reservation in a first portion of SCI for the period and may receive a second indication of a factor indicating a ratio of the modified periodic resource reservation to the periodic resource reservation. The first portion of the SCI may be received on a PSCCH, and the second indication may be comprised in a second portion of the SCI that is received on a PSSCH. The second indication may be based on a configured candidate value.

For example, as illustrated at 1508, the wireless device may receive SCI indicating a direction of expansion for the modified periodic resource reservation for the period, as described above in connection with the expansion direction indication 1124 of FIG. 11. For example, 1508 may be performed by the SCI component 1648 of the apparatus 1602 of FIG. 16. The direction may include one or more of a first direction in the time domain or a second direction in the frequency domain.

At 1510, the wireless device may determine reserved resources based on the modification, as described above in connection with 1126 of FIG. 11. For example, 1510 may be performed by a determination component 1654 of the apparatus 1602 of FIG. 16. For example, the wireless device may determine that the modified resources are reduced from the periodic resource reservation in time and/or frequency. In another example, the wireless device may determine that the modified resources are expanded in time and/or frequency from the periodic resource reservation.

At 1512, the wireless device transmits or receives sidelink communication in the period based on a modified periodic resource, as described in connection with the sidelink communications 1132, 1134 of FIG. 11. For example, 1512 may be performed by a sidelink communication component 1644 of the apparatus 1602 of FIG. 16.

Figure 16:
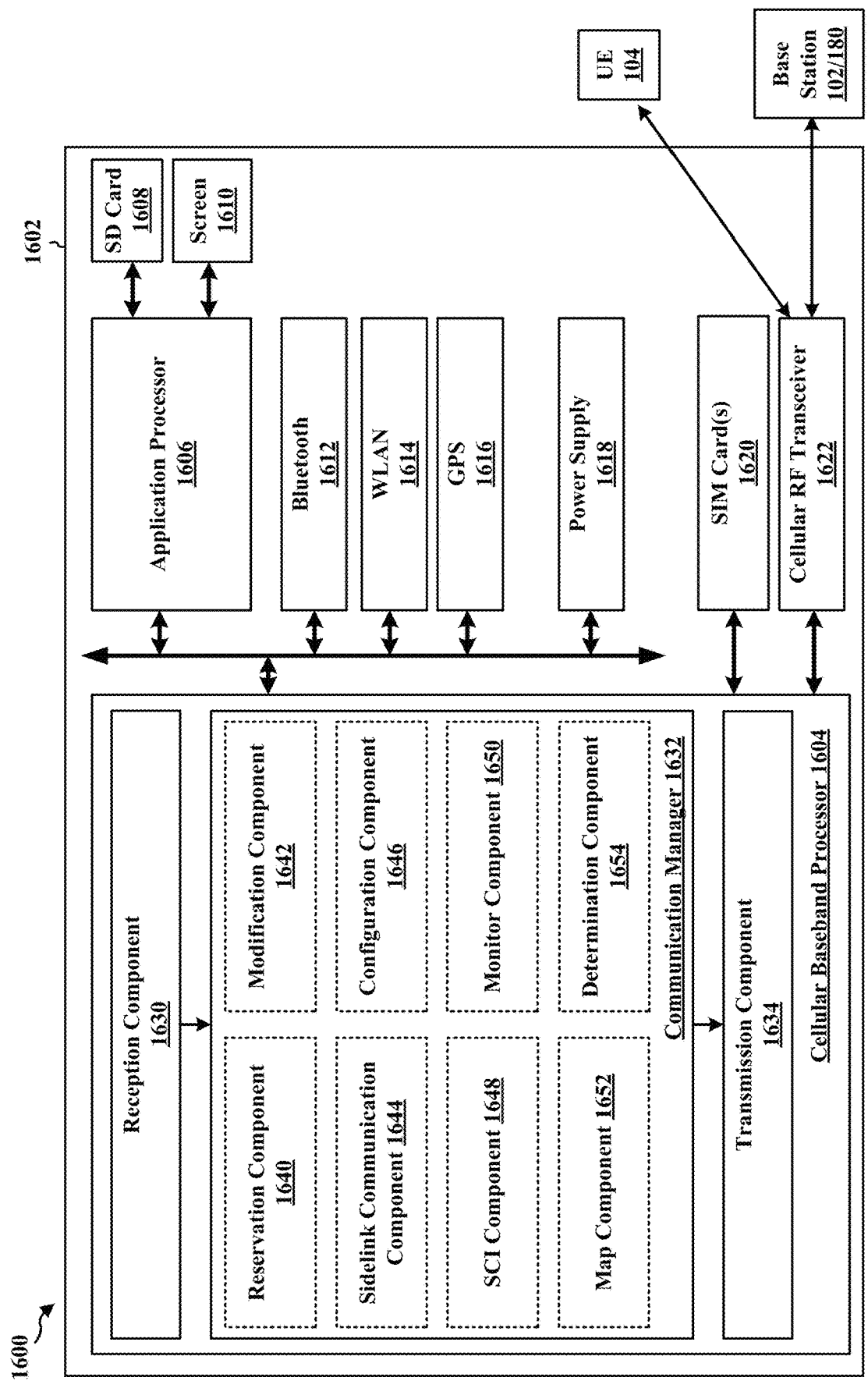
FIG. 16 is a diagram illustrating an example of a hardware implementation for an example apparatus, in accordance with the teachings disclosed herein.

FIG. 16 is a diagram 1600 illustrating an example of a hardware implementation for an apparatus 1602. The apparatus 1602 may be a sidelink device, such as a UE, a component of a UE, or may implement UE functionality. In some aspects, the apparatus 1602 may include a baseband processor 1604 (also referred to as a modem) coupled to an RF transceiver 1622. In some aspects, the baseband processor 1604 may be a cellular baseband processor, and the RF transceiver 1622 may be a cellular RF transceiver. In some aspects, the apparatus 1602 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and/or a power supply 1618. The baseband processor 1604 communicates through the RF transceiver 1622 with the UE 104 and/or base station 102/180. The baseband processor 1604 may include a computer-readable medium/memory. The computer-readable medium/memory may be non-transitory. The baseband processor 1604 is responsible for general processing, including the execution of software stored on the computer-readable medium/memory. The software, when executed by the baseband processor 1604, causes the baseband processor 1604 to perform the various functions described supra. The computer-readable medium/memory may also be used for storing data that is manipulated by the baseband processor 1604 when executing software. The baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband processor 1604. The baseband processor 1604 may be a component of the second wireless communication device 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire wireless device (e.g., see the second wireless communication device 350 of FIG. 3) and include the additional modules of the apparatus 1602.

The communication manager 1632 includes a reservation component 1640 that is configured to reserve periodic resources for sidelink transmission, for example, as described in connection with 1202 of FIG. 12 and/or 1306 of FIG. 13. The example reservation component 1640 may also be configured to receive a periodic resource reservation for sidelink transmission, for example, as described in connection with 1402 of FIG. 14 and/or 1502 of FIG. 15.

The communication manager 1632 also includes a modification component 1642 that is configured to modify the reserved periodic resources within a period based on a traffic load for the period, for example, as described in connection with 1204 of FIG. 12 and/or 1312 of FIG. 13. The example modification component 1642 may also be configured to receive a modification of the periodic resource reservation for a period, for example, as described in connection with 1404 of FIG. 14 and/or 1506 of FIG. 15.

The communication manager 1632 also includes a sidelink communication component 1644 that is configured to transmit sidelink communication in the period based on the modified periodic resources, for example, as described in connection with 120C of FIG. 12 and/or 1322 of FIG. 13. The example sidelink communication component 1644 may also be configured to transmit or receive sidelink communication in the period based on a modified periodic resource, for example, as described in connection with 1406 of FIG. 14 and/or 1512 of FIG. 15.

The communication manager 1632 also includes a configuration component 1646 that is configured to receive a configuration of the threshold, for example, as described in connection with 1302 of FIG. 13. The example configuration component 1646 may also be configured to receive a configuration of the range for modifying the reserved periodic resources, for example, as described in connection with 1304 of FIG. 13.

The communication manager 1632 also includes an SCI component 1648 that is configured to transmit an indication in SCI that the reserved periodic resources are resources capable of being modified, for example, as described in connection with 1308 of FIG. 13. The example SCI component 1648 may also be configured to transmit an indication of the modified periodic resources in SCI for the period, for example, as described in connection with 1314 of FIG. 13. The example SCI component 1648 may also be configured to transmit SCI indicating a direction of expansion for the modified periodic resources for the period, for example, as described in connection with 1316 of FIG. 13. The example SCI component 1648 may also be configured to receive an indication in SCI that that the periodic resource reservation is capable of being modified, for example, as described in connection with 1504 of FIG. 15. The example SCI component 1648 may also be configured to receive SCI indicating a direction of expansion for the modified periodic resource reservation for the period, for example, as described in connection with 1508 of FIG. 15.

The communication manager 1632 also includes a monitor component 1650 that is configured to monitor for a conflicting resource reservation from another wireless device, for example, as described in connection with 1310 of FIG. 13.

The communication manager 1632 also includes a map component 1652 that is configured to map data of the sidelink communication jointly to a set of resources that includes the reserved periodic resources and the expanded resources, for example, as described in connection with 1318 of FIG. 13. The example map component 1652 may also be configured to map code blocks of data for the sidelink communication to the reserved periodic resources and the expanded resources, for example, as described in connection with 1320 of FIG. 13.

The communication manager 1632 also includes a determination component 1654 that is configured to determine reserved resources based on the modification, for example, as described in connection with 1510 of FIG. 15.

The apparatus may include additional components that perform each of the blocks of the algorithm in the flowcharts of FIGS. 12, 13, 14, and/or 15. As such, each block in the flowcharts of FIGS. 12, 13, 14, and/or 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband processor 1604, includes means for reserving periodic resources for sidelink transmission. The example apparatus 1602 also includes means for modifying the reserved periodic resources within a period based on a traffic load for the period. The example apparatus 1602 also includes means for transmitting sidelink communication in the period based on the modified periodic resources.

In another configuration, the example apparatus 1602 also includes means for reducing or expanding the reserved periodic resources.

In another configuration, the example apparatus 1602 also includes means for modifying the reserved periodic resources for the period so that the modified periodic resources are contained within the reserved periodic resources.

In another configuration, the example apparatus 1602 also includes means for modifying the reserved periodic resources for the period so that the reserved periodic resources are contained within the modified periodic resources.

In another configuration, the example apparatus 1602 also includes means for transmitting a first indication in SCI to indicate that the reserved periodic resources are resources capable of being modified. The example apparatus 1602 also includes means for transmitting a second indication in the SCI to indicate that the reserved periodic resources are resources incapable of being modified.

In another configuration, the example apparatus 1602 also includes means for increasing or decreasing the reserved periodic resources within the period in one or more of a time domain or a frequency domain.

In another configuration, the example apparatus 1602 also includes means for transmitting SCI indicating a direction of expansion for the modified periodic resources for the period, and where the direction includes one or more of a first direction in the time domain or a second direction in the frequency domain.

In another configuration, the example apparatus 1602 also includes means for modifying the reserved periodic resources to expand the reserved periodic resources for the period based on a priority level of the sidelink communication meeting a threshold.

In another configuration, the example apparatus 1602 also includes means for monitoring for a conflicting resource reservation from a second wireless device. The example apparatus 1602 also includes means for modifying the reserved periodic resources to expand the reserved periodic resources for the period based on an absence of the conflicting resource reservation.

In another configuration, the example apparatus 1602 also includes means for expanding the reserved periodic resources to include expanded resources. The example apparatus 1602 also includes means for mapping data of the sidelink communication jointly to a set of resources that includes the reserved periodic resources and the expanded resources.

In another configuration, the example apparatus 1602 also includes means for expanding the reserved periodic resources to include expanded resources. The example apparatus 1602 also includes means for mapping code blocks of data for the sidelink communication to the reserved periodic resources and the expanded resources.

In another configuration, the example apparatus 1602 also includes means for expanding the reserved periodic resources to include expanded resources. The example apparatus 1602 also includes means for transmitting a transmission in the reserved periodic resources. The example apparatus 1602 also includes means for repeating the transmission in the expanded resources.

In another configuration, the example apparatus 1602 also includes means for receiving a periodic resource reservation for sidelink transmission. The example apparatus 1602 also includes means for receiving a modification of the periodic resource reservation for a period. The example apparatus 1602 also includes means for transmitting or receiving sidelink communication in the period based on a modified periodic resource.

In another configuration, the example apparatus 1602 also includes means for determining reserved resources based on the modification. The example apparatus 1602 also includes means for transmitting or receiving the sidelink communication based on the determined reserved resources.

In another configuration, the example apparatus 1602 also includes means for receiving a first indication in SCI to indicate that the reserved periodic resources are resources capable of being modified. The example apparatus 1602 also includes means for receiving a second indication in SCI to indicate that the reserved periodic resources are resources incapable of being modified.

In another configuration, the example apparatus 1602 also includes means for receiving SCI indicating a direction of expansion for the modified periodic resource reservation for the period, the direction including one or more of a first direction in a time domain or a second direction in a frequency domain.

The means may be one or more of the components of the apparatus 1602 configured to perform the functions recited by the means. As described supra, the apparatus 1602 may include the TX processor 368, the RX processor 356, and the controller/processor 359. As such, in one configuration, the means may be the TX processor 368, the RX processor 356, and the controller/processor 359 configured to perform the functions recited by the means.

Example techniques disclosed herein enable a transmitting device to reserve a set of periodic resources that may be used to serve (or transmit) aperiodic traffic. For example, disclosed techniques enable the transmitting UE to adapt or "softly change" the resource allocation (e.g., the actual resource used to transmit a packet) during a transmission period, for example, based on a traffic load. However, as other devices may use information regarding periodic resource reservations to determine what resources are available for transmitting a packet, examples disclosed herein provide techniques for limiting the modification to the reserved resources so that other devices may continue to rely on periodic resource reservations for their determinations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a wireless device including at least processor coupled to a memory and configured to reserve periodic resources for sidelink transmission; modify the reserved periodic resources within a period based on a traffic load for the period; and transmit sidelink communication in the period based on the modified periodic resources.

Aspect 2 is the apparatus of aspect 1, further including that to modify the reserved periodic resources, the memory and the at least one processor are further configured to: reduce or expand the reserved periodic resources.

Aspect 3 is the apparatus of any of aspects 1 and 2, further including that a ratio of the modified periodic resources to the reserved periodic resources for the sidelink transmission is within a range.

Aspect 4 is the apparatus of any of aspects 1 to 3, further including that if the modified periodic resources comprise fewer resources than the reserved periodic resources for the period, the memory and the at least one processor are further configured to: modify the reserved periodic resources for the period so that the modified periodic resources are contained within the reserved periodic resources.

Aspect 5 is the apparatus of any of aspects 1 to 4, further including that if the modified periodic resources comprise more resources than the reserved periodic resources for the period, the memory and the at least one processor are further configured to: modify the reserved periodic resources for the period so that the reserved periodic resources are contained within the modified periodic resources.

Aspect 6 is the apparatus of any of aspects 1 to 5, further including that the memory and the at least one processor are further configured to: transmit a first indication in SCI to indicate that the reserved periodic resources are resources capable of being modified, or transmit a second indication in the SCI to indicate that the reserved periodic resources are resources incapable of being modified.

Aspect 7 is the apparatus of any of aspects 1 to 6, further including that to modify the reserved periodic resources within the period, the memory and the at least one processor are further configured to: increase or decrease the reserved periodic resources within the period in one or more of a time domain or a frequency domain.

Aspect 8 is the apparatus of any of aspects 1 to 7, further including that the memory and the at least one processor are further configured to: transmit SCI indicating a direction of expansion for the modified periodic resources for the period, wherein the direction includes one or more of a first direction in the time domain or a second direction in the frequency domain.

Aspect 9 is the apparatus of any of aspects 1 to 8, further including that the memory and the at least one processor are further configured to: modify the reserved periodic resources to expand the reserved periodic resources for the period based on a priority level of the sidelink communication meeting a threshold.

Aspect 10 is the apparatus of any of aspects 1 to 9, further including that the memory and the at least one processor are further configured to: monitor for a conflicting resource reservation from a second wireless device, and modify the reserved periodic resources to expand the reserved periodic resources for the period based on an absence of the conflicting resource reservation.

Aspect 11 is the apparatus of any of aspects 1 to 10, further including that to modify the reserved periodic resources for the period, the memory and the at least one processor are further configured to: expand the reserved periodic resources to include expanded resources; and map data of the sidelink communication jointly to a set of resources that includes the reserved periodic resources and the expanded resources.

Aspect 12 is the apparatus of any of aspects 1 to 11, further including that to modify the reserved periodic resources for the period, the memory and the at least one processor are further configured to: expand the reserved periodic resources to include expanded resources; and map code blocks of data for the sidelink communication to the reserved periodic resources and the expanded resources.

Aspect 13 is the apparatus of any of aspects 1 to 12, further including that to modify the reserved periodic resources for the period, the memory and the at least one processor are further configured to: expand the reserved periodic resources to include expanded resources; transmit a transmission in the reserved periodic resources; and repeat the transmission in the expanded resources.

Aspect 14 is the apparatus of any of aspects 1 to 13, further including that a transceiver coupled to the at least one processor.

Aspect 15 is a method of wireless communication for implementing any of aspects 1 to 14.

Aspect 16 is an apparatus for wireless communication including means for implementing any of aspects 1 to 14.

Aspect 17 is a non-transitory computer-readable storage medium storing computer executable code, where the code, when executed, causes a processor to implement any of aspects 1 to 14.

Aspect 18 is an apparatus for wireless communication at a wireless device including at least processor coupled to a memory and configured to receive a periodic resource reservation for sidelink transmission; receive a modification of the periodic resource reservation for a period; and transmit or receive sidelink communication in the period based on a modified periodic resource.

Aspect 19 is the apparatus of aspect 18, further including that the memory and the at least one processor are further configured to: determine reserved resources based on the modification, and transmit or receive the sidelink communication based on the determined reserved resources.

Aspect 20 is the apparatus of any of aspects 18 and 19, further including that the modification includes reduced resources or increased resources for the period.

Aspect 21 is the apparatus of any of aspects 18 to 20, further including that the memory and the at least one processor are further configured to: receive a first indication in SCI to indicate that the reserved periodic resources are resources capable of being modified, or receive a second indication in SCI to indicate that the reserved periodic resources are resources incapable of being modified.

Aspect 22 is the apparatus of any of aspects 18 to 21, further including that the memory and the at least one processor are further configured to: receive SCI indicating a direction of expansion for the modified periodic resource reservation for the period, the direction including one or more of a first direction in a time domain or a second direction in a frequency domain.

Aspect 23 is the apparatus of any of aspects 18 to 22, further including that a transceiver coupled to the at least one processor.

Aspect 24 is a method of wireless communication for implementing any of aspects 18 to 23.

Aspect 25 is an apparatus for wireless communication including means for implementing any of aspects 18 to 23.

Aspect 26 is a non-transitory computer-readable storage medium storing computer executable code, where the code, when executed, causes a processor to implement any of aspects 18 to 23.

The invention claimed is:

1. An apparatus for wireless communication at a wireless device, comprising:
a memory; and
at least one processor coupled to the memory and configured to:
reserve periodic resources for sidelink transmission;
modify the reserved periodic resources within a period based on a traffic load for the period, wherein to modify the reserved periodic resources, the at least one processor is further configured to:
reduce or expand the reserved periodic resources according to a ratio of modified periodic resources to the reserved periodic resources; and
transmit sidelink communication in the period based on the modified periodic resources.

2. The apparatus of claim 1, wherein the ratio of the modified periodic resources to the reserved periodic resources for the sidelink transmission is within a range.

3. The apparatus of claim 1, wherein if the modified periodic resources comprise fewer resources than the reserved periodic resources for the period, the at least one processor is further configured to:
modify the reserved periodic resources for the period so that the modified periodic resources are contained within the reserved periodic resources.

4. The apparatus of claim 1, wherein if the modified periodic resources comprise more resources than the reserved periodic resources for the period, the at least one processor is further configured to:
modify the reserved periodic resources for the period so that the reserved periodic resources are contained within the modified periodic resources.

5. The apparatus of claim 1, wherein the at least one processor is further configured to:
transmit a first indication in sidelink control information (SCI) to indicate that the reserved periodic resources are resources capable of being modified, or
transmit a second indication in the SCI to indicate that the reserved periodic resources are resources incapable of being modified.

6. The apparatus of claim 1, wherein to modify the reserved periodic resources within the period, the at least one processor is further configured to:
increase or decrease the reserved periodic resources within the period in one or more of a time domain or a frequency domain.

7. The apparatus of claim 6, wherein the at least one processor is further configured to:
transmit sidelink control information (SCI) indicating a direction of expansion for the modified periodic resources for the period, wherein the direction includes one or more of a first direction in the time domain or a second direction in the frequency domain.

8. The apparatus of claim 1, wherein the at least one processor is further configured to:
modify the reserved periodic resources to expand the reserved periodic resources for the period based on a priority level of the sidelink communication meeting a threshold.

9. The apparatus of claim 1, wherein the at least one processor is further configured to:
monitor for a conflicting resource reservation from a second wireless device, and
modify the reserved periodic resources to expand the reserved periodic resources for the period based on an absence of the conflicting resource reservation.

10. The apparatus of claim 1, wherein to modify the reserved periodic resources for the period, the at least one processor is further configured to:
expand the reserved periodic resources to include expanded resources; and
map data of the sidelink communication jointly to a set of resources that includes the reserved periodic resources and the expanded resources.

11. The apparatus of claim 1, wherein to modify the reserved periodic resources for the period, the at least one processor is further configured to:
expand the reserved periodic resources to include expanded resources; and
map code blocks of data for the sidelink communication to the reserved periodic resources and the expanded resources.

12. The apparatus of claim 1, wherein to modify the reserved periodic resources for the period, the at least one processor is further configured to:
expand the reserved periodic resources to include expanded resources;
transmit a transmission in the reserved periodic resources; and
repeat the transmission in the expanded resources.

13. The apparatus of claim 1, further comprising a transceiver coupled to the at least one processor.

14. A method of wireless communication at a wireless device, comprising:
reserving periodic resources for sidelink transmission;
modifying the reserved periodic resources within a period based on a traffic load for the period, wherein modifying the reserved periodic resources includes reducing or expanding the reserved periodic resources according to a ratio of modified periodic resources to the reserved periodic resources; and
transmitting sidelink communication in the period based on the modified periodic resources.

15. The method of claim 14, wherein if the modified periodic resources comprise fewer resources than the reserved periodic resources for the period, the wireless device modifies the reserved periodic resources for the period so that the modified periodic resources are contained within the reserved periodic resources.

16. The method of claim 14, wherein if the modified periodic resources comprise more resources than the reserved periodic resources for the period, the wireless device modifies the reserved periodic resources for the period so that the reserved periodic resources are contained within the modified periodic resources.

17. The method of claim 14, further comprising:
transmitting a first indication in sidelink control information (SCI) to indicate that the reserved periodic resources are resources capable of being modified, or
transmitting a second indication in the SCI to indicate that the reserved periodic resources are resources incapable of being modified.

18. The method of claim 14, wherein modifying the reserved periodic resources within the period comprises:
increasing or decreasing the reserved periodic resources within the period in one or more of a time domain or a frequency domain; and
transmitting sidelink control information (SCI) indicating a direction of expansion for the modified periodic resources for the period, wherein the direction includes one or more of a first direction in the time domain or a second direction in the frequency domain.

19. The method of claim 14, further comprising:
monitoring for a conflicting resource reservation from a second wireless device,
wherein the wireless device modifies the reserved periodic resources to expand the reserved periodic resources for the period based on an absence of the conflicting resource reservation.

20. The method of claim 14, wherein modifying the reserved periodic resources for the period includes expanding the reserved periodic resources to include expanded resources, the method further comprising:
mapping data of the sidelink communication jointly to a set of resources that includes the reserved periodic resources and the expanded resources.

21. The method of claim 14, wherein modifying the reserved periodic resources for the period includes expanding the periodic resources to include expanded resources, wherein the wireless device transmits a transmission in the periodic resources and repeats the transmission in the expanded resources.

22. An apparatus for wireless communication at a wireless device, comprising:
a memory; and
at least one processor coupled to the memory and configured to:
receive a periodic resource reservation for reserved periodic resources for sidelink transmission;
receive a modification of the periodic resource reservation for a period, wherein the modification of the periodic resource reservation includes reduced resources or increased resources for the period according to a ratio of modified periodic resources to the reserved periodic resources; and transmit or receive sidelink communication in the period based on the modified periodic resources.

23. The apparatus of claim 22, wherein the at least one processor is further configured to:
   receive a first indication in sidelink control information (SCI) to indicate that the reserved periodic resources are resources capable of being modified, or
   receive a second indication in SCI to indicate that the reserved periodic resources are resources incapable of being modified.

24. The apparatus of claim 22, wherein the at least one processor is further configured to:
   receive sidelink control information (SCI) indicating a direction of expansion for the modified periodic resource reservation for the period, the direction including one or more of a first direction in a time domain or a second direction in a frequency domain.

25. The apparatus of claim 22, further comprising a transceiver coupled to the at least one processor.

26. A method of wireless communication at a wireless device, comprising:
   receiving a periodic resource reservation for reserved periodic resources for sidelink transmission;
   receiving a modification of the periodic resource reservation for a period, wherein the modification of the periodic resource reservation includes reduced resources or increased resources for the period according to a ratio of modified periodic resources to the reserved periodic resources; and
   transmitting or receiving sidelink communication in the period based on the modified periodic resources.

\* \* \* \* \*